United States Patent
Shinohara et al.

(10) Patent No.: US 9,249,327 B2
(45) Date of Patent: Feb. 2, 2016

(54) IMAGE FORMING METHOD

(71) Applicant: FUJIFILM CORPORATION, Tokyo (JP)

(72) Inventors: Ryuji Shinohara, Kanagawa (JP); Naotaka Wachi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 325 days.

(21) Appl. No.: 13/849,338

(22) Filed: Mar. 22, 2013

(65) Prior Publication Data
US 2013/0260036 A1 Oct. 3, 2013

(30) Foreign Application Priority Data

Mar. 28, 2012 (JP) .................. 2012-075113
Aug. 1, 2012 (JP) .................. 2012-171402
Feb. 18, 2013 (JP) .................. 2013-028933

(51) Int. Cl.
B05D 1/00 (2006.01)
C09D 11/38 (2014.01)
C09D 11/322 (2014.01)

(52) U.S. Cl.
CPC .............. C09D 11/38 (2013.01); C09D 11/322 (2013.01)

(58) Field of Classification Search
None
See application file for complete search history.

(56) References Cited

U.S. PATENT DOCUMENTS

| | | | |
|---|---|---|---|
| 6,846,352 B2 | 1/2005 | Yatake | |
| 2005/0128272 A1* | 6/2005 | Morohoshi et al. | 347/100 |
| 2006/0017767 A1* | 1/2006 | Matsuzawa et al. | 347/21 |
| 2009/0202724 A1 | 8/2009 | Arai et al. | |
| 2009/0219335 A1 | 9/2009 | Furukawa | |
| 2010/0166962 A1 | 7/2010 | Ohzeki | |
| 2010/0239759 A1 | 9/2010 | Tojo et al. | |
| 2011/0043578 A1* | 2/2011 | Tojo | 347/102 |
| 2011/0227994 A1* | 9/2011 | Yanagi | 347/21 |
| 2011/0234692 A1 | 9/2011 | Haijima et al. | |
| 2011/0249055 A1* | 10/2011 | Sasada et al. | 347/20 |
| 2012/0026240 A1 | 2/2012 | Saito | |

FOREIGN PATENT DOCUMENTS

| | | |
|---|---|---|
| EP | 0 753 552 A1 | 1/1997 |
| EP | 2 090 627 A1 | 8/2009 |
| EP | 2 230 281 A1 | 9/2010 |
| JP | 3160068 A | 7/1991 |
| JP | 04-018465 A | 1/1992 |
| JP | 2867491 B2 | 3/1999 |
| JP | 2000-345082 A | 12/2000 |
| JP | 2001-096891 A | 4/2001 |
| JP | 2002-047438 A | 2/2002 |
| JP | 2004-051779 A | 2/2004 |
| JP | 2005-082613 A | 3/2005 |
| JP | 2005-082663 A | 3/2005 |
| JP | 2006-056234 A | 3/2006 |
| JP | 2007-009132 A | 1/2007 |
| JP | 2009-190379 A | 8/2009 |
| JP | 2009-191135 A | 8/2009 |
| JP | 2009-196293 A | 9/2009 |
| JP | 2010-143961 A | 7/2010 |
| JP | 2010-155359 A | 7/2010 |
| JP | 2010-222420 A | 10/2010 |
| JP | 2011-042150 A | 3/2011 |
| JP | 2011-074255 A | 4/2011 |
| JP | 2012-046740 A | 3/2012 |
| WO | 01/48101 A1 | 7/2001 |

OTHER PUBLICATIONS

An Office Action; "Notice of Reasons for Rejection," issued by the Japanese Patent Office on Jul. 1, 2014, which corresponds to Japanese Patent Application No. 2013-028933 and is related to U.S. Appl. No. 13/849,338; with English language translation.
The extended European Search Report dated Jul. 17, 2013, which corresponds to EP Application No. 13160584.2-1302, and is related to U.S. Appl. No. 13/849,338.
An Office Action; "Notice of First Office Action," issued by the State Intellectual Property Office of the People's Republic of China on Jul. 1, 2015, which corresponds to Chinese Patent Application No. 201310092913.6 and is related to U.S. Appl. No. 13/849,338; with English language translation.

* cited by examiner

Primary Examiner — Vu A Nguyen
(74) Attorney, Agent, or Firm — Studebaker & Brackett PC

(57) ABSTRACT

An image forming method includes an ink applying step of applying an ink composition containing a pigment, a compound represented by the following structural formula (1), a compound represented by the following structural formula (2) and water, onto a recording medium being conveyed at a conveyance speed of 80 m/min or higher:

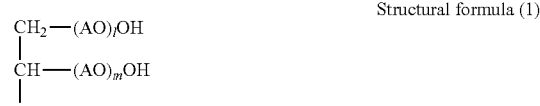

wherein l, m and n each represent an integer of 1 or more (l+m+n=3 to 15); AO represents ethyleneoxy or propyleneoxy; R represents a hydrocarbon group having 6 to 30 carbon atoms; PO represents propyleneoxy; EO represents ethyleneoxy; and p and q represent integers that satisfy the relations: $0 \leq p \leq 10$ and $1 \leq q \leq 50$.

18 Claims, No Drawings

IMAGE FORMING METHOD

BACKGROUND OF THE INVENTION

1. Field of the Invention

The present invention relates to an image forming method using a water-based ink composition.

2. Description of the Related Art

In recent years, as a result of the progress in inkjet recording technologies, there have been suggested image forming technologies utilizing an inkjet method as a method for forming high definition images directed to photograph applications or offset printing applications. Similarly to the conventional image forming technologies, in the case of forming an image by an inkjet method as well, it is required that high quality images can be formed at a high speed.

More recently, there is a tendency that the demand for image forming at a high speed is further increasing. For example, in a system of drawing an image (forming an image) at a high speed by using a rolled paper, scratch resistance of an image obtained after drawing is important. That is, if the scratch resistance of an image is low, after an image is drawn, when the rolled paper that had been subjected to drawing is rolled and piled up for a short time, the image may be brought into contact with paper and rubbed, and blurring, bleeding or the like may occur in the image, so that the product value may be lost.

Specifically, if the scratch resistance of a drawn image is poor, a trouble occurs such that when a character image is drawn, the character may become faint, and when dropout characters are drawn, the characters cannot be read. Furthermore, when an image of a bar code or a QR Code (registered trademark) is drawn, a trouble that the code may not be normally read in may occur. Such a trouble is likely to occur significantly, particularly in a paper in which an ink pigment can be easily retained at the paper surface, for example, a paper exclusive for inkjet printing that does not have a porous ink-receiving layer (for example, a business form paper for inkjet printing). Particularly, a business form paper is generally used in applications where drawing is achieved at a high speed, and is required to have high strength against abrasion on images.

Furthermore, in the case of forming an image according to an inkjet method, there are occasions in which print suitability to crimped postcards is required in addition to the paper exclusive for inkjet printing.

On the other hand, in regard to the ink used in inkjet methods, attention is paid to water-based inks in view of considering the environment. For example, from the viewpoints of ejection stability of the ink, and print quality such as less bleeding of an image on ordinary paper, aqueous inks containing ethylene oxide adducts or propylene oxide adducts of glycerin have been disclosed (see, for example, JP2009-191135A; JP2005-82613A; WO2001/048101; JP1992-18465A (JP-H04-18465A); and JP2004-51779A).

Furthermore, in view of obtaining high glossiness on glossy paper for inkjet printing, ink compositions using compounds formed from ethylene oxide-propylene oxide block copolymers have been disclosed (see, for example, JP2005-82663A and JP2007-9132A). Furthermore, inks for inkjet printing containing an organic solvent which has a structure containing an ethyleneoxy group or a propyleneoxy group together with a coloring material (pigment), water and the like have also been disclosed (see, for example, JP2000-345082A and JP2011-74255A).

In addition to those, it has been disclosed that inks containing a wax as a slipping agent provide abrasion resistance of an image (see, for example, JP2010-155359A and JP2867491B).

SUMMARY OF THE INVENTION

Among the conventional technologies described above, in the descriptions of JP2009-191135A, JP2005-82613A, WO2001/048101, JP1992-18465A (JP-H04-18465A), and JP2004-51779A, the ink ejection performance, bleeding of an image and the like that may easily occur during image drawing are considered. Furthermore, in the descriptions of JP2005-82663A, JP2007-9132A, JP2010-155359A, and JP2867491B, glossiness of an image on glossy paper for inkjet printing and scratch resistance of an image are considered. However, in the case of performing high speed image drawing, there is a risk that scratch resistance of the image may be insufficient. Furthermore, in the conventional technologies described in JP2000-345082A and JP2011-74255A, an improvement of print performance such as non-bleeding of characters, or prevention of white dropout defects in images have been attempted; however, there is still room for improvement in view of scratch resistance of the image on the occasion of performing high speed image drawing.

The present invention was made in view of such circumstances, and it is an object of the invention to provide an image forming method which, in the case of forming an image at a high speed by using an arbitrary recording medium such as a business form paper for inkjet printing, is capable of producing an image having superior scratch resistance (may also be referred to as abrasion resistance) compared with conventional image forming methods, and to achieve the object described above.

An image forming method for achieving the object described above is as follows.

<1> Provided is an image forming method including an ink applying step of applying an ink composition containing a pigment, a compound represented by the following structural formula (1), a compound represented by the following structural formula (2), and water onto a recording medium being conveyed at a conveyance speed of 80 m/min or higher (for example, in the sub-scanning direction). In the ink applying step, an image is formed by the application of the ink composition onto the recording medium.

[Chem. 1]

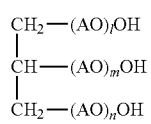

Structural formula (1)

In the structural formula (1), l, m and n each independently represent an integer of 1 or more, and satisfy the relation: l+m+n=3 to 15; and AO represents at least one of ethyleneoxy and propyleneoxy.

[Chem. 2]

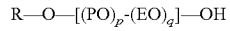

Structural formula (2)

In the structural formula (2), R represents a hydrocarbon group having 6 to 30 carbon atoms, and may be any one of a saturated group or an unsaturated group; PO represents propyleneoxy; EO represents ethyleneoxy; and p and q each independently represent an integer, and satisfies the relations: $0 \leq p \leq 10$ and $1 \leq q \leq 50$.

<2> The image forming method described in item <1>, wherein the ink composition further includes a wax, is provided.

<3> The image forming method described in item <1> or <2>, wherein AO in the structural formula (1) is propyleneoxy, is provided.

<4> The image forming method described in any one of items <1> to <3>, wherein in the structural formula (2), R represents an alkyl group having 8 to 24 carbon atoms or an alkenyl group having 8 to 24 carbon atoms, the range of p is such that $0 \leq p \leq 8$, and the range of q is such that $5 \leq q \leq 50$, is provided.

<5> The image forming method described in any one of items <1> to <4>, wherein the ink composition further includes a wax, and the wax is in the form of wax particles.

<6> The image forming method described in any one of items <1> to <5>, wherein the ink composition further includes a pyrrolidone derivative.

<7> The image forming method described in any one of items <1> to <6>, wherein the ink composition further includes a pyrrolidone derivative, and the pyrrolidone derivative is at least one of 2-pyrrolidone and N-methyl-2-pyrrolidone.

<8> The image forming method described in any one of items <1> to <7>, wherein the ink composition further includes a wax, and at least one kind of the wax is carnauba wax.

<9> The image forming method described in any one of items <1> to <8>, wherein the pigment is a resin-coated pigment in which at least a portion of the pigment surface is coated with a crosslinked polymer obtained by crosslinking a water-soluble resin with a crosslinking agent.

<10> The image forming method described in item <9>, wherein the water-soluble resin contains a carboxyl group or a salt thereof in the molecule, and the crosslinking agent is a bifunctional or higher-functional epoxy compound.

<11> The image forming method described in any one of items <1> to <10>, wherein the content of the compound represented by structural formula (1) is 5.0 mass % to 40.0 mass % relative to the total mass of the ink composition.

<12> The image forming method described in any one of items <1> to <11>, wherein the content of the compound represented by structural formula (2) is 0.01 mass % to 10.0 mass % relative to the total mass of the ink composition.

<13> The image forming method described in any one of items <1> to <12>, wherein the ink composition further includes a wax, and the content of the wax is 0.03 mass % to 15.0 mass % relative to the total mass of the ink composition.

<14> The image forming method described in any one of items <1> to <13>, wherein the ink composition includes a pyrrolidone derivative, and the content of the pyrrolidone derivative is 3.0 mass % to 20.0 mass % relative to the total mass of the ink composition.

<15> The image forming method described in any one of items <1> to <14>, wherein the ink composition further includes resin particles having a glass transition temperature of 80° C. or higher. Preferably, the resin particles have a hydrophilic constituent unit and a hydrophobic constituent unit.

<16> The image forming method described in any one of items <1> to <15>, further including a heating and fixing step of heating the ink composition applied by applying processing to fix the ink composition onto the recording medium.

According to the invention, there is provided an image forming method in which, in the case of forming an image at a high speed by using an arbitrary recording medium such as a business form paper for inkjet printing, an image having superior scratch resistance (may also be referred to as abrasion resistance) compared with conventional images may be obtained.

DESCRIPTION OF THE PREFERRED EMBODIMENTS

Hereinafter, the image forming method of the invention will be described in detail.

The image forming method of the invention is configured to include an ink applying step of forming an image by applying an ink composition which contains a pigment, a compound represented by the following structural formula (1), a compound represented by the following structural formula (2) and water, on a recording medium being conveyed (for example, in the sub-scanning direction) at a conveyance speed of 80 m/min or higher. The image forming method of the invention may also be provided with, if necessary, another step such as heating and fixing of the image thus formed.

In regard to the ink composition for inkjet recording, various compositions have been hitherto suggested, and ink compositions which use solvents having a structure containing an ethyleneoxy chain or a propyleneoxy chain are known. However, it is conventional that the high abrasion resistance required in images formed on a recording medium being conveyed at a high speed of 80 m/min or higher is not taken into consideration.

According to the invention, the ink composition is an ink composition which is used in the case of performing inkjet recording at a high speed, in which the conveyance speed of the recording medium as viewed from the ejection head is 80 m/min or higher (for example, in the case of drawing images sequentially at a high speed by using rolled paper or the like that is used for high speed recording applications, such as a business form paper), and which contains a compound having at least one of a propyleneoxy (PO) block and an ethyleneoxy (EO) block (compound represented by structural formula (2)) and a glycerin-based compound (compound represented by structural formula (1)). By using this ink composition, when an image is formed at a high speed, subduction of the pigment in the ink composition to the recording medium is promoted, and thus an image strength with which the image does not easily have blurring or the like caused by abrasion, is obtained. Thereby, when high speed image drawing is carried out by an inkjet method on a recording medium being conveyed at a high speed of 80 m/min or higher, an image having superior abrasion resistance compared with conventional ink images can be obtained.

Furthermore, the image forming method of the invention also exhibits print suitability to crimped paper such as crimped postcard (prevention of ink transfer to the opposite surface by crimping).

In the case of crimped paper such as crimped postcard, an image is drawn on a crimped postcard paper which has been precoated with a crimping paste, and the crimped postcard paper sheets are laminated by passing them through a crimping machine to obtain a crimped postcard. When it is intended to see the drawn image part, the laminated section of the crimped postcard is peeled to open. However, at that time, it is required that the characters, images and the like that have been drawn should not be projected on the opposite surface. When the characters and the like that are drawn as such are imprinted to the drawn image site on the opposite surface that faces the surface having a drawn image, and information is added thereto, it is difficult to read the characters and the like. Also, this may lead to a failure such as a problem that normal judgment cannot be achieved. However, in the technologies that have been conventionally suggested, nothing has been anticipated regarding impartation of print suitability (an image is not imprinted to the opposite face) to a crimped paper, that is, impartation of a performance in which ink impression in the case where high speed image drawing is carried out on the image-drawn surface having a paste applied thereon, and then the image is crimped by exerting a crimping force, is not likely to occur. Therefore, from the viewpoint of print suitability to a crimped paper, sufficient performance has not been secured in the current situation. In the present invention, when the paper is crimped by applying a paste after an image is formed, the phenomenon in which the image is transferred (ink impression) to the opposite surface that faces the surface where the image is formed is prevented. Therefore, an image having print suitability to a crimped surface can be obtained.

As described above, the present invention is distinguished from conventional methods from the viewpoint that the invention is appropriate for the characteristics that are demanded in accordance with image formation at a high speed of 80 m/min or higher, by using a compound containing at least one of a PO block and an EO block and a specific glycerin-based compound in combination.

The "business form paper" used as a recording medium according to the invention is also called fanfold paper and is a paper having form processing suitability. The business form paper is used in the field of business forms, for example, in the applications of slips, application forms, bills, leaflets, catalogues, and direct mails.

Furthermore, the crimped paper refers to, for example, a crimped postcard in which a paste agent is applied on the facing surfaces of a paper that has been half-folded so that the facing surfaces adhere to each other at the time of crimping, and image drawing is carried out over the paste agent.

Hereinafter, the ink applying step that constitutes the image forming method of the present invention and other processes provided as necessary will be described in detail.

—Ink Applying Step—

The ink applying step according to the invention corresponds to image formation, and an ink composition containing a pigment, a compound represented by structural formula (1) shown below, a compound represented by structural formula (2) and water is applied on a recording medium being conveyed (for example, in a sub-scanning direction) at a conveyance speed of 80 m/min or higher.

In the ink applying step according to the invention, while multiple sheets of long paper or rolled long paper is conveyed at a conveyance speed of 80 m/min or higher in a direction that is perpendicular to the scanning direction of the inkjet head (for example, a sub-scanning direction), plural images are formed at a high speed. In general, when the conveyance speed of the recording medium is fast, the deposited ink composition rapidly penetrates into the recording medium, or when the image cannot maintain a certain degree of strength for a short time, different sheets of the recording medium undergo abrasion, and the image quality is likely to deteriorate. This phenomenon is particularly likely to occur at a conveyance speed in the range of 80 m/min or higher.

From the viewpoint of increasing the speed of image formation, it is preferable that the conveyance speed be faster, and the conveyance sped is more preferably 100 m/min or higher, and even more preferably 150 m/min or higher. The upper limit of the conveyance speed is not particularly limited, but from the viewpoint of the necessity of conveying a recording medium stably, the upper limit of the conveyance speed is preferably 350 m/min or less.

The formation of an image by using an inkjet method can be carried out by ejecting an ink composition onto a desired recording medium by supplying energy. Meanwhile, regarding a preferred image forming method of the present invention, the method described in paragraphs [0093] to [0105] of JP2003-306623A can be applied.

The inkjet method is not particularly limited, and may be of any known system, for example, a charge control system of ejecting an ink utilizing an electrostatic attraction force, a piezo-inkjet system of ejecting an ink by using a piezoelectric element which produces mechanical strain when a voltage is applied, an acoustic inkjet system of converting electric signals into acoustic beams, radiating them to an ink, and ejecting the ink utilizing a radiation pressure, and a thermal inkjet system of heating an ink to form bubbles and utilizing the resultant pressure (BUBBLEJET (registered trade mark)).

Examples of the inkjet method include a system of injecting a number of ink droplets of low concentration, a so-called "photo-ink" each in a small volume, a system of improving an image quality using plural inks of a substantially identical hue and of different concentrations, and a system of using a colorless transparent ink.

The inkjet method according to the invention is suitably a piezo-inkjet system. By combining the ink composition of the invention or an ink set containing this ink composition with the piezo-inkjet system, continuous ejectability and ejection stability of the ink are further enhanced. In the piezo-inkjet system, the strain form of the piezoelectric element may be any of a bending mode, a longitudinal mode, and a shear mode. The configuration of the piezoelectric element and the structure of the piezo head are not particularly limited, and any known technologies can be employed.

The ink nozzle and the like used when recording is performed by an inkjet method are not particularly limited, and can be appropriately selected according to the purpose.

The inkjet method applicable to the invention may be a shuttle system in which, as long as the conveyance speed of the recording medium can be maintained at 80 m/min or higher as described above, a short serial head is used and recording is performed while allowing the head to scan in the lateral direction of a recording medium (main-scanning direction). However, an embodiment in which a line system using a line head in which recording elements are arranged corresponding to the entire region for one side of a recording medium, is preferred. In the case of the line system, an image can be recorded over the entire surface of the recording medium by allowing the recording medium to be scanned in the direction (for example, sub-scanning direction) intersecting (for example, perpendicular) the direction of arrangement (main-scanning direction) of the recording elements. Further, in the present invention, the conveyance speed of 80 m/min or higher means that the recording medium is conveyed at a conveyance speed of 80 m/min or higher. That is, the image forming method of the present invention includes an ink applying step of applying an ink composition on a recording medium being conveyed, for example, in a sub-scanning direction at a conveyance speed of 80 m/min or higher.

The amount of ink droplet of the ink composition thus ejected is, when the resolution is 1200 dpi×1200 dpi, preferably from 0.5 pl to 10 pl (picoliters), more preferably from 1 pl to 5 pl, and even more preferably from 2 pl to 4 pl, from the viewpoint of obtaining high accuracy images. Furthermore, when the resolution is 600 dpi×600 dpi, the amount of ink droplet is preferably 2.0 pl to 24 pl (picoliters), more preferably 4 pl to 20 pl, and even more preferably 8 pl to 16 pl.

Next, the details of the ink composition according to the invention will be described in detail.

(Pigment)

The ink composition according to the invention contains at least one pigment. The pigment can be appropriately selected according to the purpose, and may be any of an organic pigment or an inorganic pigment.

Examples of the organic pigment include an azo pigment, a polycyclic pigment, a dye chelate, a nitro pigment, a nitroso pigment, and aniline black. Among these, an azo pigment, a polycyclic pigment and the like are more preferred. Examples of the azo pigment include an azo lake, an insoluble azo pigment, a condensed azo pigment, and a chelate azo pigment. Examples of the polycyclic pigment include a phthalocyanine pigment, a perylene pigment, a perinone pigment, an anthraquinone pigment, a quinacridone pigment, a dioxazine pigment, an indigo pigment, a thioindigo pigment, an isoindolinone pigment, and a quinophthalone pigment. Examples of the dye chelate include a basic dye chelate and an acidic dye chelate.

Examples of the inorganic pigment include titanium oxide, iron oxide, calcium carbonate, barium sulfate, aluminum hydroxide, barium yellow, cadmium red, chrome yellow, and carbon black. Among these, carbon black is particularly preferred. Meanwhile, examples of the carbon black include those produced according to known methods such as a contact method, a furnace method and a thermal method. Among these pigments, a water-dispersible pigment is preferred.

Specific examples of the water-dispersible pigment include pigments of the following items (1) to (4).

(1) An encapsulated pigment, that is, a polymer dispersion obtained by incorporating a pigment into polymer microparticles, and more particularly, a pigment which enables a pigment to be dispersed in water by coating at least a portion of the pigment surface with a water-insoluble resin and hydrophilizing the resin layer of the pigment surface.

(2) A self-dispersing pigment, that is, a pigment having at least one hydrophilic functional group at the pigment surface and exhibits at least any one of water-dispersibility and water-solubility in the absence of a dispersant, and more particularly, a pigment in which mainly carbon black or the like is subjected to surface oxidation and hydrophilization, and the pigment simple substance is dispersed in water.

(3) A resin-dispersed pigment, that is, a pigment dispersed by a water-soluble polymer compound having a weight average molecular weight of 50,000 or less.

(4) A surfactant-dispersed pigment, that is, a pigment dispersed by a surfactant.

Here, the (1) encapsulated pigment will be described in detail.

The resin used in the encapsulated pigment is not limited, but is preferably a polymer compound which has self-dispersion capacity or dissolution capacity in a mixed solvent of water and a water-soluble organic solvent and has an anionic group (acidic group). This resin is usually a resin having a number average molecular weight preferably in the range of 1,000 to 100,000, and particularly preferably in the range of 3,000 to 50,000. Furthermore, this resin is preferably a resin which dissolves in an organic solvent and forms a solution. If the number average molecular weight of the resin is in the range described above, the function as a coating film for the pigment or as a coating film prepared into an ink can be exhibited. The resin is preferably used in the form of a salt of an alkali metal or an organic amine.

Specific examples of the resin that is used in the encapsulated pigment include materials having anionic groups, including a thermoplastic, thermosetting or modified acrylic resin, an epoxy-based resin, a polyurethane-based resin, a polyether-based resin, a polyamide-based resin, an unsaturated polyester-based resin, a phenolic resin, a silicone-based resin, and a fluorine-based resin; polyvinyl-based resins such as polyvinyl chloride, polyvinyl acetate, polyvinyl alcohol, and polyvinyl butyral; polyester-based resins such as an alkyd resin and a phthalic acid resin; amino-based materials such as a melamine resin, a melamine formaldehyde resin, an aminoalkyd co-condensate resin, and a urea resin; and copolymers or mixtures thereof.

Among these resins, the anionic acrylic resin may be obtained by, for example, polymerizing an acrylic monomer having an anionic group (hereinafter, referred to as "anionic group-containing acrylic monomer") and if necessary, another monomer capable of copolymerizing with the anionic group-containing acrylic monomer in a solvent. Examples of the anionic group-containing acrylic monomer include acrylic monomers having one or more anionic groups selected from the group consisting of a carboxyl group, a sulfonic acid group, and a phosphono group, and among them, an acrylic monomer having a carboxyl group is particularly preferred. Specific examples of the acrylic monomer having a carboxyl group include acrylic acid, methacrylic acid, crotonic acid, ethacrylic acid, propylacrylic acid, isopropylacrylic acid, itaconic acid, and fumaric acid. Among these, acrylic acid or methacrylic acid is preferred.

The encapsulated pigment can be produced by a conventional physical or chemical method by using the components described above. For example, the encapsulated pigment can be produced by the methods described in JP1997-151342A (JP-H9-151342A), JP1998-140065A (JP-H10-140065A), JP1999-209672A (JP-H11-209672A), JP1999-172180A (JP-H11-172180A), JP1998-25440A (JP-H10-25440A), or W1999-43636A (JP-H11-43636A). Specific examples include a reverse phase emulsification method and an acid precipitation method described in JP1997-151342A (JP-H9-151342A) and JP1998-140065A (JP-H10-140065A), and among these, a reverse phase emulsification method is preferred from the viewpoint of dispersion stability. The reverse phase emulsification method will be described below.

Furthermore, the self-dispersing pigment is another preferred example. The self-dispersing pigment is a pigment capable of dispersing in an aqueous medium without using a dispersant for pigment dispersion, by having plural hydrophilic functional groups and/or salts thereof (hereinafter, referred to as "dispersibility imparting groups) bonded to the pigment surface directly or indirectly through an alkyl group, an alkyl ether group, an aryl group or the like. Here, the phrase "dispersing in an aqueous medium without using a dispersant" implies that the pigment can be dispersed in an aqueous medium even if a dispersant for dispersing a pigment is not used.

An ink containing the self-dispersing pigment as a colorant usually needs not contain a dispersant which is incorporated in order to disperse a pigment, and therefore, an ink which hardly exhibits foaming caused by a decrease in defoamability attributable to the dispersant and has excellent ejection stability can be easily prepared. Examples of the dispersibility imparting group that is bonded to the surface of the self-dispersing pigment include —COOH, —CO, —OH, —SO$_3$H, —PO$_3$H$_2$, quaternary ammonium and salts thereof. The dispersibility imparting group is bonded by subjecting a pigment to a physical treatment or a chemical treatment, and bonding (grafting) a dispersibility imparting group or an active species having a dispersibility imparting group to the pigment surface. Examples of the physical treatment include a vacuum plasma treatment. Furthermore, examples of the chemical treatment include a wet oxidation method of oxidizing the pigment surface in water by using an oxidizing agent, and a method of bonding p-aminobenzoic acid to the pigment surface and thereby bonding a carboxyl group via a phenyl group.

In the present invention, for example, a self-dispersing pigment which is surface treated by an oxidation treatment using hypohalous acid and/or a hypohalite, or an oxidation treatment using ozone may be mentioned as a preferred example. Regarding the self-dispersing pigment, a commercially available product may be used, and specifically, MICROJET CW-1 (product name; manufactured by Orient Chemical Industries Co., Ltd.), CAB-O-JET200, and CAB-O-JET300 (product name; manufactured by Cabot Corp.).

The pigment is preferably an encapsulated pigment in which at least a portion of the pigment surface is coated with a water-insoluble resin by using a water-insoluble resin in the presence of a pigment dispersant (for example, a polymer emulsion in which a pigment is incorporated in water-insoluble resin particles), and more particularly, a water-dispersible pigment in which at least a portion of the pigment is coated with a water-insoluble resin, and a resin layer is formed at the pigment surface so that the pigment can be dispersed in water, is preferred. Using these encapsulated pigments coated with water-insoluble resins is preferred from the viewpoint of the aggregatability of the pigment, and in the case of performing high speed recording, it is preferred from the viewpoint of being capable of forming images with high resolution.

Here, the reverse phase emulsification method will be described.

The reverse phase emulsification method is in principle a self-dispersing (reverse phase emulsification) method of dispersing a mixed molten product of a resin having a self-dispersing capacity or dissolution capacity and a pigment in water. Furthermore, this mixed molten product may also include a curing agent, or a polymer compound and a curing agent. Here, the mixed molten product refers to a product including any of a state of being mixed without being dissolved, a state of being dissolved and mixed, or both the states. A more specific production method of the "reverse phase emulsification method" may be a method described in JP1998-140065A (JP-H10-140065A).

—Pigment Dispersant—

A pigment dispersant can promote easy dispersion when the pigment is dispersed, and dispersion stabilization after dispersion. Examples of the pigment dispersant include a nonionic compound, an anionic compound, a cationic compound, and an amphoteric compound. For example, a copolymer of a monomer having an $\alpha,\beta$-ethylenically unsaturated group may be used. Examples of the monomer having an $\alpha,\beta$-ethylenically unsaturated group include ethylene, propylene, butene, pentene, hexene, vinyl acetate, allyl acetate, acrylic acid, methacrylic acid, crotonic acid, crotonic acid ester, itaconic acid, itaconic acid monoester, maleic acid, maleic acid monoester, maleic acid diester, fumaric acid, fumaric acid monoester, vinylsulfonic acid, styrenesulfonic acid, sulfonated vinylnaphthalene, vinyl alcohol, acrylamide, methacryloxyethyl phosphate, bismethacryloxyethyl phosphate, methacryloxyethylphenyl acid phosphate, ethylene glycol dimethacrylate, diethylene glycol dimethacrylate; styrene derivatives such as styrene, $\alpha$-methylstyrene, and vinyltoluene; vinylcyclohexane, vinylnaphthalene, vinylnaphthalene derivatives, an acrylic acid alkyl ester which may be substituted with aromatic groups, acrylic acid phenyl ester, a methacrylic acid alkyl ester which may be substituted with an aromatic group, methacrylic acid phenyl ester, a methacrylic acid cycloalkyl ester, a crotonic acid alkyl ester, an itaconic acid dialkyl ester, a maleic acid dialkyl ester, and derivatives of the above compounds.

A homopolymer obtainable by homopolymerizing a monomer having an $\alpha,\beta$-ethylenically unsaturated group, or a copolymer obtainable by copolymerizing plural kinds of the foregoing monomers can be used as a polymeric dispersant (pigment dispersant). Specific examples include an acrylic acid alkyl ester-acrylic acid copolymer, a methacrylic acid alkyl ester-methacrylic acid copolymer, a styrene-acrylic acid alkyl ester-acrylic acid copolymer, a styrene-methacrylic acid phenyl ester-methacrylic acid copolymer, a styrene-methacrylic acid cyclohexyl ester-methacrylic acid copolymer, a styrene-styrenesulfonic acid copolymer, a styrene-maleic acid copolymer, a styrene-methacrylic acid copolymer, a styrene-acrylic acid copolymer, a vinylnaphthalene-maleic acid copolymer, a vinylnaphthalene-methacrylic acid copolymer, a vinylnaphthalene-acrylic acid copolymer, polystyrene, polyester, and polyvinyl alcohol.

The pigment dispersant is preferably a dispersant having a weight average molecular weight of 2,000 to 60,000.

The amount of the pigment dispersant added to the pigment is preferably in the range of from 10% to 100% by mass of the pigment, more preferably from 20% to 70% of the pigment, and even more preferably from 40% to 50% of the pigment.

Furthermore, the pigment according to the invention is preferably a resin-coated pigment in which at least a portion of the pigment surface is coated with a crosslinked polymer obtained by crosslinking a water-soluble resin with a crosslinking agent. The water-soluble resin acts as a dispersant for dispersing the pigment. Since the pigment is coated with a crosslinked polymer, when the pigment is prepared into a pigment dispersion or into an ink composition using the pigment dispersion, excellent stability (stability against pH fluctuation, and stability against temperature fluctuation) can be imparted.

Examples of the water-soluble resin include polyvinyls, polyurethanes, and polyesters, and among them, polyvinyls are preferred.

The water-soluble resin has a group which causes a crosslinking reaction caused by a crosslinking agent in the molecule (site to be crosslinked). Such a group is not particularly limited, but examples thereof include a carboxyl group or a salt thereof, an isocyanate group, and an epoxy group. According to the invention, from the viewpoint of enhancing dispersibility, a water-soluble resin having a carboxyl group or a salt thereof is preferred.

The water-soluble resin that can be used in the invention is preferably a copolymer obtainable by using a carboxyl group-containing monomer as a copolymerization component. Examples of the carboxyl group-containing monomer include methacrylic acid, $\beta$-carboxyethyl acrylate, fumaric acid, itaconic acid, maleic acid, and crotonic acid, and among them, from the viewpoints of crosslinkability and dispersion stability, methacrylic acid or $\beta$-carboxyethyl acrylate is preferred.

Furthermore, in addition to the carboxyl group-containing monomer, an arbitrarily selected hydrophilic monomer or hydrophobic monomer may also be used as a copolymerization component. The hydrophilic monomer may be ionic or nonionic. The hydrophobic monomer is not particularly limited, but an alkyl methacrylate having 1 to 20 carbon atoms, or an alkyl acrylate having 1 to 20 carbon atoms is preferred.

The water-soluble resin may be a random polymer, or any of a block polymer or a graft polymer.

The acid value of the water-soluble resin (number of milligrams (mg) of KOH required to neutralize 1 g of the water-soluble resin) is preferably 135 mg KOH/g to 250 mg KOH/g, more preferably 135 mg KOH/g to 200 mg KOH/g, and particularly preferably 135 mg KOH/g to 180 mg KOH/g, from the viewpoints of the dispersibility of the pigment and the dispersion stability.

The synthesis method of a polymer as a water-soluble resin is not particularly limited, but random polymerization of a vinyl monomer is preferred from the viewpoint of dispersion stability.

Regarding the crosslinking agent, a compound having two or more sites that cause a crosslinking reaction (crosslinking sites) can be used, and among others, from the viewpoint of having excellent reactivity with a carboxyl group, a bifunctional or higher-functional epoxy compound (that is, a compound having two or more epoxy groups) is preferred. Specific examples of the bifunctional or higher-functional epoxy compound include ethylene glycol diglycidyl ether, polyethylene glycol diglycidyl ether, 1,6-hexanediol diglycidyl ether, diethylene glycol diglycidyl ether, dipropylene glycol diglycidyl ether, and polypropylene glycol diglycidyl ether. Polyethylene glycol diglycidyl ether or diethylene glycol diglycidyl ether is preferred.

The molar ratio of the crosslinking site of the crosslinking agent and the site to be crosslinked of the water-soluble resin is, from the viewpoint of the crosslinking reaction rate and the stability of the dispersion after crosslinking, preferably 1:1.1 to 1:10, more preferably 1:1.1 to 1:5, and most preferably 1:1.1 to 1:3.

The amount of the water-soluble resin with respect to the pigment is preferably 10 mass % to 250 mass %, more preferably 10 mass % to 200 mass %, even more preferably 20 mass % to 150 mass %, and particularly preferably 30 mass % to 100 mass %.

A resin-coated pigment in which the pigment surface is coated with a crosslinked polymer obtained by crosslinking a water-soluble resin with a crosslinking agent, can be obtained by a process of dispersing a pigment by using a water-soluble resin and then crosslinking the water-soluble resin with a crosslinking agent. A preferred example of the preparation method includes a method of carrying out the following steps (1) to (3):

(1) A dispersion step of dispersing a pigment and a water-soluble resin in water or an aqueous solution of a polar solvent, and obtaining a pigment dispersion liquid;

(2) A crosslinking step of heating the pigment dispersion liquid obtained in the step (1) with an added crosslinking agent, and performing a crosslinking reaction to coat the pigment surface with a crosslinked polymer; and (3) A step of purifying the resin-coated pigment coated with a crosslinked polymer.

In addition to these steps, other steps may also be appropriately provided. In the step (1), regarding the polar solvent and the like, any known agents can be appropriately used.

In regard to the pigment, one kind may be used alone, or plural kinds can be selected from within each group or among various groups and used in combination.

The content of the pigment in the ink composition is, from the viewpoints of color density, particulate properties, ink stability, and ejection reliability, preferably an amount of 0.1 mass % to 15 mass %, more preferably an amount of 0.5 mass % to 12 mass %, and particularly preferably 1 mass % to 10 mass %, relative to the total mass of the ink composition.

(Compound Represented by Structural Formula (1))

The ink composition according to the invention contains at least one kind of a compound represented by structural formula (1). The compound represented by the structural formula (1) is an alkylene oxide adduct of glycerin represented by the following structure. When this compound is incorporated into the ink composition, penetration of the ink into a recording medium can be suppressed to an extent that abrasion resistance of the image is not significantly impaired.

[Chem. 3]

Structural formula (1)

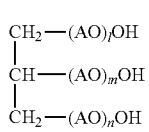

In the structural formula (1), l, m and n each independently represent an integer of 1 or more, and satisfy the relation: l+m+n=3 to 15. When the value of l+m+n is 3 or more, the curl suppressing effect is satisfactory, and when the value is 15 or less, satisfactory ink ejection properties can be maintained. Among others, the value of l+m+n is preferably in the range of 3 to 12, and more preferably in the range of 3 to 10. AO in the structural formula (1) represents at least one of ethyleneoxy (may be abbreviated to EO) and propyleneoxy (may be abbreviated to PO), and among these, propyleneoxy is preferred. AO's in $(AO)_l$, $(AO)_m$, and $(AO)_n$ may be identical with or different from each other. Furthermore, when l, m and n each represent an integer of 2 or more, plural AO's may be identical with or different from each other.

Examples of the compound represented by the structural formula (1) will be described below. Meanwhile, the values within the parentheses are SP values. However, in the present invention, the compound is not limited to these.

[Chem. 4]

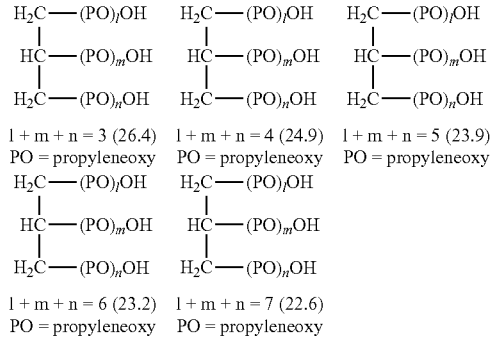

EO and PO represent ethyleneoxy and propyleneoxy, respectively.

Regarding the alkylene oxide adduct of glycerin, a commercially available product that is being marketed may be used. For example, as polyoxypropylated glycerin (an ether of polypropylene glycol and glycerin), SANNIX GP-250 (average molecular weight 250), SANNIX GP-400 (average molecular weight 400), and SANNIX GP-600 (average molecular weight) [all manufactured by Sanyo Chemical Industries, Ltd.]; LEOCON GP-250 (average molecular weight 250), LEOCON GP-300 (average molecular weight 300), LEOCON GP-400 (average molecular weight 400), LEOCON GP-700 (average molecular weight 700) [all manufactured by Lion Corp.]; and polypropylene triol glycol-triol type (average molecular weight 300, average molecular weight 700) [all manufactured by Wako Pure Chemical Industries, Ltd.].

The SP value (solubility parameter/unit: $(cal/cm^3)^{1/2}$) is a value represented by the root mean square of molecular aggregation energy, and is calculated by the method described in R. F. Fedors, Polymer Engineering Science, 14, p. 147-154 (1974).

The SP value is preferably in the range of 27.5 or less.

Furthermore, the ink composition may further contain another water-soluble organic solvent in addition to the compound represented by structural formula (1). In this case, 70 mass % or more of the total amount of the compound represented by the structural formula (1) and the other water-soluble organic solvent included in the ink composition is preferably such that the SP value is 27.5 or less. When the SP value is 27.5 or less, the occurrence of curling in various environmental humidity values after image formation is further suppressed. Also, when the ink composition contains the resin particles that will be described below, the organic solvent and the resin particles interact, and fixing properties are improved. Particularly, when components having relatively lower SP values 27.5) are included in a large amount, scratch resistance of the image can be further enhanced. Furthermore, it is also effective in suppressing offset.

The content of the compound represented by the structural formula (1) in the ink composition is preferably 3.0 mass % to 45.0 mass %, more preferably 5.0 mass % to 40.0 mass %, even more preferably 7.0 mass % to 35.0 mass %, and particularly preferably 8.0 mass % to 30.0 mass %, relatively to the total mass of the ink composition.

When the content of the compound represented by the structural formula (1) is 5.0 mass % or more, the penetrability of the ink composition to the recording medium is alleviated, and strike through of the ink is also prevented.

Examples of the other water-soluble organic solvent include the water-soluble organic solvents described in paragraphs [0036] to [0039] of JP2009-190379A, and the other water-soluble organic solvent may be appropriately selected from these and used.

(Compound Represented by Structural Formula (2))

The ink composition according to the invention contains at least one kind of a compound represented by the following structural formula (2). When this compound is used in combination in the composition containing a compound represented by the structural formula (1) described above, abrasion resistance of the image is enhanced. Furthermore, transfer of ink (ink impression) after image formation at a high speed and crimping on a crimped paper that is obtained by crimping paper surfaces applied with paste after image drawing, can be prevented.

[Chem. 5]

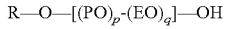   Structural formula (1)

In the structural formula (2), R represents a hydrocarbon group having 6 to 30 carbon atoms, and may be any of a saturated hydrocarbon group or an unsaturated hydrocarbon group. Furthermore, R may be linear, branched or cyclic.

Examples of the hydrocarbon group having 6 to 30 carbon atoms represented by R include an alkyl group, an alkenyl group, an alkynyl group, an aromatic group, and an alicyclic group.

From the viewpoint of subduing the pigment onto the recording medium at the time of image formation, it is preferable that the carbon chain be longer and more hydrophobic, and specifically, a chain-like saturated hydrocarbon group having 8 to 24 carbon atoms and a chain-like unsaturated hydrocarbon group having 8 to 24 carbon atoms are preferred; and a chain-like saturated hydrocarbon group having 10 to 22 carbon atoms and a chain-like unsaturated hydrocarbon group having 10 to 22 carbon atoms are more preferred. The chain-like saturated hydrocarbon groups and the chain-like unsaturated hydrocarbon groups include a linear structure and a branched structure, but a linear structure is preferred. The hydrocarbon group is particularly preferably a linear chain-like saturated hydrocarbon group having 10 to 22 carbon atoms, or a linear chain-like unsaturated hydrocarbon group having 10 to 22 carbon atoms.

Examples of the alkyl group include an octyl group, a nonyl group, a decyl group, an undecyl group, a lauryl (dodecyl) group, a tridecyl group, a tetradecyl group, a cetyl (hexadecyl) group, a stearyl (octadecyl) group, a nonadecyl group, an icosyl group, and a behenyl (docosyl) group. Among them, an alkyl group having 8 to 24 carbon atoms is preferred, and an alkyl group having 10 to 22 carbon atoms is more preferred.

Examples of the alkenyl group include an octenyl group, a nonenyl group, a decenyl group, an undecenyl group, a dodecenyl group, a tridecenyl group, a tetradecenyl group, a hexadecenyl group, an oleyl (octadecenyl) group, a nonadecenyl group, an icosenyl group, and a docosenyl group. Among them, an alkenyl group having 8 to 24 carbon atoms is preferred, and an alkenyl group having 10 to 22 carbon atoms is more preferred.

Examples of the alkynyl group include an octynyl group, a nonynyl group, a decynyl group, an undecynyl group, a dodecynyl group, a tridecynyl group, a tetradecynyl group, a hexadecynyl group, an octadecynyl group, a nonadecynyl group, an icosynyl group, and a docosynyl group. Among them, an alkynyl group having 8 to 24 carbon atoms is preferred, and an alkynyl group having 10 to 22 carbon atoms is more preferred.

Examples of the aromatic group include a nonylphenyl group, an octylphenyl group, a naphthyl group, and a trimethylphenyl group.

Examples of the alicyclic group include an isobornyl group, a norbornyl group, a dicyclopentanyl group, a dicyclopentenyl group, and an adamantyl group.

Among the groups described above, R is more preferably an alkyl group, an alkenyl group, or an alkynyl group; more preferably an alkyl group having 8 to 24 carbon atoms, or an alkenyl group having 8 to 24 carbon atoms; and even more preferably an alkyl group having 10 to 22 carbon atoms, or an alkenyl group having 10 to 22 carbon atoms.

In the structural formula (2), PO is propyleneoxy, and represents —$CH_2CH_2CH_2O$— or —$CH(CH_3)CH_2O$—. EO is ethyleneoxy, and represents —$CH_2CH_2O$—.

p and q that represent the repetition numbers of PO and EO, respectively, each independently represent an integer such that the relations: $0 \leq p \leq 10$ and $1 \leq q \leq 50$ are satisfied. From the viewpoint of imparting suitability to crimped paper, the range of p is preferably $0 \leq p \leq 8$, and the range of q is preferably $5 \leq q \leq 50$.

In the structural formula (2), an embodiment in which R represents an alkyl group having 8 to 24 carbon atoms or an alkenyl group having 8 to 24 carbon atoms, p is in the range of $0 \leq p \leq 8$, and p is in the range of $5 \leq q \leq 50$, is particularly preferred.

Preferred specific examples of the compound represented by the structural formula (2) include the following compounds.

[Chem. 6]

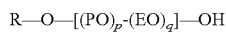

R—O—[(PO)$_p$-(EO)$_q$]—OH

| | R (Carbon number) | p | q |
|---|---|---|---|
| 1 | Octyl group (8) | 0 | 4 |
| 2 | Octyl group (8) | 0 | 7 |
| 3 | Octyl group (8) | 0 | 15 |
| 4 | Decyl group (10) | 0 | 15 |
| 5 | Lauryl group (12) | 0 | 10 |
| 6 | Lauryl group (12) | 0 | 23 |
| 7 | Cetyl group (16) | 0 | 7 |
| 8 | Cetyl group (16) | 0 | 15 |
| 9 | Cetyl group (16) | 0 | 20 |
| 10 | Cetyl group (16) | 0 | 40 |
| 11 | Cetyl group (16) | 4 | 20 |
| 12 | Cetyl group (16) | 8 | 20 |
| 13 | Stearyl group (18) | 0 | 10 |
| 14 | Stearyl group (18) | 0 | 20 |
| 15 | Behenyl group (22) | 0 | 20 |
| 16 | Behenyl group (22) | 0 | 30 |
| 17 | Oleyl group (18) | 0 | 4 |
| 18 | Oleyl group (18) | 0 | 7 |
| 19 | Oleyl group (18) | 0 | 15 |
| 20 | Oleyl group (18) | 0 | 20 |
| 21 | Oleyl group (18) | 0 | 50 |

Regarding the compound represented by the structural formula (2), a commercially available product that is being marketed may also be used. Preferred examples of the commercially available product include EMULGEN 106, EMULGEN 123P, EMULGEN 210P, EMULGEN 220, EMULGEN 306P, EMULGEN 320P, EMULGEN 420 (all manufactured by Kao Corp.); NONION E-205S, NONION E-215, NONION E-220S, NONION E-230, UNISAFE 10P-4, UNISAFE 20P-4, UNISAFE 5P-8, UNISAFE 10P-8, and UNISAFE 20P-8 (all manufactured by NOF Corp.).

The content of the compound represented by the structural formula (2) in the ink composition is preferably 0.01 mass % to 13.0 mass %, more preferably 0.01 mass % to 10.0 mass %, even more preferably 0.02 mass % to 8.5 mass %, and particularly preferably 0.02 mass % to 7.0 mass %, relative to the total mass of the ink composition, from the viewpoints of imparting suitability to crimped paper and ink ejection properties. When the content is 13.0 mass % or less, ejection failure of ink caused by nozzle clogging or the like is avoided, and when the content is 0.01 mass % or more, it is preferable in view of imparting suitability to crimped paper.

(Resin Particles)

The ink composition according to the invention preferably further contains at least one kind of resin particles. When the ink composition contains resin particles, scratch resistance of the image can be further enhanced by performing a heat treatment after image formation.

The resin particles are preferably self-dispersing resin particles having a hydrophilic constituent unit (repeating unit derived from a hydrophilic monomer) and a hydrophobic constituent unit (repeating unit derived from a hydrophobic monomer), and it is more preferable that the ink composition contain resin particles (preferably, self-dispersing resin particles) which contain a hydrophilic constituent and a hydrophobic constituent unit and have a glass transition temperature (Tg) of 80° C. or higher, from the viewpoint of further increasing the scratch resistance of the image. Tg being 80° C. or higher means that the resin particles are hydrophobic. When the Tg of the resin particles included is 80° C. or higher, the fixing properties of the ink composition to the recording medium and the abrasion resistance of the image are improved.

Furthermore, Tg of the resin particles is more preferably 100° C. to 300° C., more preferably 130° C. to 250° C., and particularly preferably 160° C. to 200° C. When the glass transition temperature of the resin particles is 300° C. or lower, the abrasion resistance of recorded images is more effectively improved.

In addition, Tg is a value measured under conventional measurement conditions by using a differential scanning calorimeter (DSC) EXSTAR6220 (manufactured by SII Nanotechnology, Inc.). However, if measurement is difficult due to decomposition of the resin or the like, a calculated Tg that is calculated by the following calculation formula is applied. The calculated Tg is calculated by the following formula (1):

$$1/Tg = \Sigma(X_i/Tg_i) \quad (1)$$

Here, the polymer that is subject to the calculation is considered to have n kinds of monomer components of i=1 to n are copolymerized. Xi represents the mass fraction of the i-th monomer ($\Sigma X_i=1$), and the glass transition temperature (absolute temperature) of a homopolymer of the i-th monomer. However, Σ means the sum of i=1 to n. Furthermore, for the value of the glass transition temperature of a homopolymer of each monomer (Tgi), the values described in Polymer Handbook (3$^{rd}$ Edition) (by J. Brandrup and E. H. Immergut (Wiley-Interscience, 1989)) are employed.

Examples of the resin particles include particles of an acrylic resin, a vinyl acetate-based resin, a styrene-butadiene-based resin, a vinyl chloride-based resin, an acrylic-styrene-based resin, a butadiene-based resin, a styrene-based resin, a crosslinked acrylic resin, a crosslinked styrene-based resin, a benzoguanamine resin, a phenolic resin, a silicone resin, an epoxy resin, a urethane-based resin, a paraffin-based resin, and a fluorine-based resin. Among them, preferred examples include particles of an acrylic resin, an acrylic-styrene-based resin, a styrene-based resin, a crosslinked acrylic resin, and a crosslinked styrene-based resin.

The weight average molecular weight of the resin particles is preferably from 10,000 to 200,000, and more preferably from 100,000 to 200,000, from the viewpoint of the stability of the ink composition.

The average particle size of the resin particles is preferably in the range of 10 nm to 1 μm, more preferably 10 nm to 200 nm, even more preferably 20 nm to 100 nm, and particularly preferably 20 nm to 50 nm.

The resin particles can be used in a dispersed state such as latex.

When the ink composition contains resin particles, the content of the resin particles in the ink composition is, in terms of solid content, preferably 0.5 mass % to 20 mass %, more preferably 3 mass % to 20 mass %, and even more preferably 5 mass % to 15 mass %, relative to the total mass of the ink composition from the viewpoints of fixability, abrasion resistance, and the viscosity of the ink composition.

(Wax)

The ink composition according to the invention preferably contains at least one kind of wax. When the ink composition contains a wax, scratch resistance can be further increased. Examples of the wax include natural waxes and synthetic waxes.

Examples of natural waxes include petroleum-based waxes, plant-based waxes, and animal-based waxes.

Examples of the petroleum-based waxes include paraffin wax, microcrystalline wax, and petrolatum. Examples of the plant-based waxes include carnauba wax, candelilla wax, rice wax, and wood wax. Examples of the animal-based waxes include lanolin and beeswax.

Examples of synthetic waxes include synthetic hydrocarbon-based waxes and modified waxes.

Examples of the synthetic hydrocarbon-based waxes include polyethylene wax and Fischer-Tropsch wax. Examples of the modified waxes include a paraffin wax derivative, a montan wax derivative, and a microcrystalline wax derivative.

A paraffin wax contains hydrocarbons having 20 to 40 carbon atoms as main components, and is preferable from the viewpoint that image glossiness, and the effects of preventing moisture evaporation from nozzle tips and retaining moisture are excellent.

A polyethylene wax has excellent compatibility with resins, and therefore, is preferable from the viewpoint that uniform satisfactory images can be easily formed. Furthermore, since polyethylene waxes can be easily modified, a modified glycol-modified polyethylene wax can impart wettability attributable to glycol, and the wettability effect of the ink composition is exhibited at nozzle tips. Therefore, it is more preferable from the viewpoint that ejection stability can be made more effective.

Among them, the wax is preferably carnauba wax.

The wax may be added to the ink composition in any form such as a solution form obtainable by dissolving the wax in an appropriate solvent, an emulsion dispersion form, or a solid fine particle dispersion form. An example of the emulsion dispersion method may be a method of dissolving the wax by using an oil such as dibutyl phthalate, tricresyl phosphate, dioctyl sebacate, or tri(2-ethylhexyl)phosphate, or an auxiliary solvent such as ethyl acetate or cyclohexanone, adding an emulsifying dispersant, and mechanically preparing an emulsion dispersion. At this time, for the purpose of adjusting the viscosity of oil droplets or the refractive index, it is also preferable to add an α-ethylstyrene oligomer or a polymer such as poly(t-butylacrylamide).

Furthermore, an example of the solid fine particle dispersion method may be a method of preparing a solid dispersion by dispersing a wax powder in an appropriate solvent such as water, by means of a ball mill, a colloid mill, a vibratory ball mill, a sand mill, a jet mill, a roller mill or ultrasonication. Furthermore, a protective colloid (for example, polyvinyl alcohol) or a surfactant (for example, an anionic surfactant such as sodium triisopropylnaphthalenesulfonate (a mixture in which the substitution positions of three isopropyl groups are all different) may also be used. In the mills, beads of zirconia or the like are usually used as a dispersion medium. It is preferable to incorporate a antiseptic (for example, benzoisothiazolinone sodium salt) in an aqueous dispersion.

A particularly preferred method is an emulsion dispersion method, and the wax is preferably added into the ink composition in the form of a dispersion such as a wax emulsion. That is, the wax is preferably incorporated as wax particles (also called wax dispersed particles) in the ink composition.

[Wax Emulsion]

A wax emulsion is a wax dispersed composition containing at least a wax, water, and an emulsifying dispersant which emulsify and disperse the wax in water. The emulsifying dispersant that is used in a wax emulsion can be selected from many conventionally known emulsifying dispersants and used. Among them, a preferred emulsifying dispersant may be a dispersant represented by the following general formula (WA).

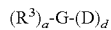   General formula (WA)

In the general formula (WA), $R^3$ represents an alkyl group having 10 to 60 carbon atoms, an alkenyl group having 10 to 60 carbon atoms, an aralkyl group having 10 to 60 carbon atoms, or an aryl group having 10 to 60 carbon atoms; D represents $(B)_n$-E; B represents —$CH_2CH_2O$—, —$CH_2CH_2CH_2O$—, —$CH(CH_3)CH_2O$—, or —$CH_2CH(OH)CH_2O$—; n represents an integer from 1 to 50; E represents a hydrogen atom, an alkyl group having 1 to 8 carbon atoms, an aryl group having 6 to 8 carbon atoms, an alkylcarbonyl group having 2 to 8 carbon atoms, or an arylcarbonyl group having 7 to 8 carbon atoms; a and d each independently represent an integer from 1 to 6. $R^3$, D and E that may be present in plural numbers when a or d is 2 or more, may be identical with or different from each other. G represents a linking group having a valency of (a+d), and satisfies the relation: 2≤a+d≤7.

The alkyl group, alkenyl group, aralkyl group and aryl group represented by $R^3$, and the alkyl group, aryl group, aralkylcarbonyl group and arylcarbonyl group represented by E may be further substituted.

The respective groups in the general formula (WA) will be described in more detail.

The alkyl group, alkenyl group and aralkyl group represented by $R^3$ may be linear, branched or cyclic. Furthermore, the alkyl group, alkenyl group, aralkyl group and aryl group represented by $R^3$ may be each independently further substituted.

Preferred examples of $R^3$ include $C_gH_{2g+1}$ (g represents an integer from 12 to 60), eicosyl, and docosanyl. Other examples include dodecyl, myristyl, cetyl, stearyl, oleyl, eicosyl, docasasyl, triacontasyl, tetracontasyl, heptacontasyl, dinonylphenyl, didodecylphenyl, tetradecylphenyl, tripentylphenyl, and dodecylnaphthyl.

D represents a polyoxyalkylene group represented by $(B)_n$-E.

Here, B represents —$CH_2CH_2O$—, —$CH_2CH_2CH_2O$—, —$CH(CH_3)CH_2O$—, or —$CH_2CH(OH)CH_2O$—, and n represents an integer from 1 to 50. Among them, B is preferably —$CH_2CH_2O$—, and n is preferably an integer from 5 to 30.

Furthermore, the alkyl group having 1 to 8 carbon atoms represented by E is preferably methyl, ethyl, propyl, butyl, hexyl, or cyclohexyl, and is particularly preferably methyl, ethyl or propyl.

The alkylcarbonyl group having 2 to 8 carbon atoms represented by E is preferably acetyl, propionyl, butyroyl, pivaloyl, or cyclohexanecarbonyl, and is particularly preferably acetyl.

The aryl group having 6 to 8 carbon atoms represented by E may be a phenyl group.

The arylcarbonyl group having 7 to 8 carbon atoms represented by E may be a benzoyl group.

Among the groups described above, E is particularly preferably a hydrogen atom, methyl, ethyl, propyl, acetyl, propionyl, or benzoyl.

The linking group having a valency of (a+d) represented by G may be a single bond when the value of (a+d) is 2. The value of (a+d) is preferably 2 to 5, more preferably 2 to 4, and even more preferably 2 or 3.

G is preferably at least one of an alkylene group and an arylene group, and this may be an ester group, an ether group, an amide group, a sulfonyl group, or a divalent linking group interrupted by a heteroatom or a heteroatomic group, such as a sulfur atom.

The heteroatom or heteroatomic group is particularly preferably an ester group, an ether group or an amide group. a and d each independently represent an integer from 1 to 6.

In addition, the dispersant represented by general formula (WA) is preferably a dispersant having lower solubility in a water-based solvent, and for example, solubility in water is preferably 0.5 mass % or less (25° C.), and more preferably 0.1 mass % or less.

Hereinafter, specific examples (WA-1 to WA-19) of the dispersant represented by general formula (WA) will be described. However, in the present invention, the dispersant is not intended to be limited to these.

[Chem. 7]

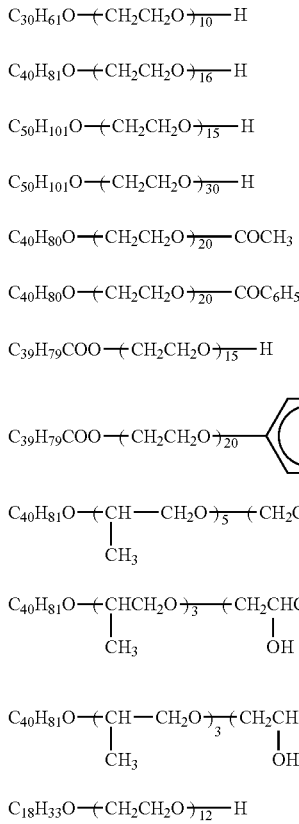

[Chem. 8]

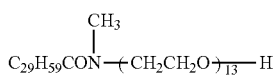

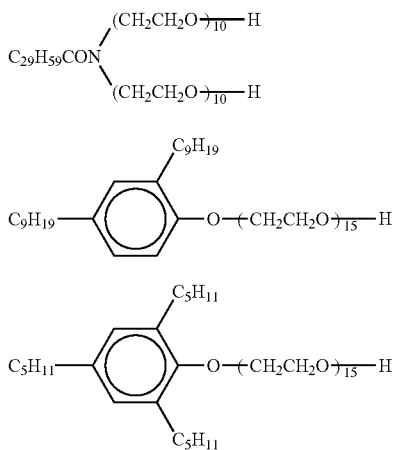

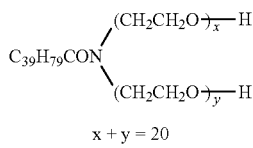

$x + y = 20$

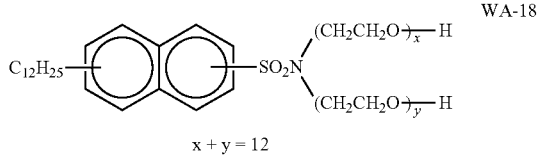

$x + y = 12$

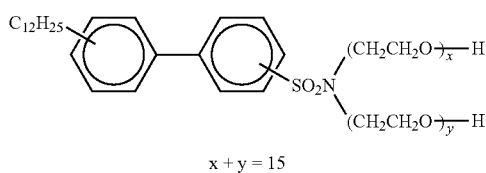

$x + y = 15$

In the wax emulsion, as the solvent that disperses a wax, at least water is used, but the solvent is not limited to this. For example, a conventional organic solvent is appropriately selected and can be used at the time of dispersion of the wax. Regarding the organic solvent that can be used at the time of dispersion of the wax, the organic solvents listed in paragraph [0049] of JP2010-155359A can be preferably used.

Thereby, the dispersion stability of the wax in a wax emulsion can be enhanced. Meanwhile, the organic solvents described above may be used as mixtures of two or more kinds of same or different kinds of solvents.

Next, the dispersed particles of wax (wax particles) in the wax emulsion will be described in more detail.

In the present invention, the composition ratio of the two components in wax particles that are composed of at least a wax and a dispersant represented by general formula (WA) (hereinafter, also referred to as a specific dispersant) is not particularly limited, but preferably, the wax particles are wax particles composed of 25 mass % to 99 mass % of a wax, and 1 mass % to 75 mass % of a dispersant. This is because as the wax content is higher, the characteristics of wax particles are exhibited more effectively.

Therefore, the specific dispersant in the wax particles is preferably such that the content ratio is as low as possible.

The wax and the specific dispersant that constitute the wax particles are preferably mixed at a temperature higher than the melting point of any component having a higher melting point between the wax and the specific dispersant, before being dispersed in water, so that the wax and the specific dispersant are subjected to so-called melt mixing. Furthermore, a solvent containing water, which serves as a dispersing medium, is similarly heated to a temperature higher than the melting point of the wax and the specific dispersant, a molten mixture is added thereto, and the mixture may be finely dispersed by various dispersing methods. In addition, it is also preferable to add a heated solvent into the molten mixture, and to disperse the molten mixture to obtain dispersed particles. Furthermore, a wax and a specific dispersant may be dissolved in a non-water-based organic solvent which dissolves the wax and the specific dispersant, subsequently the solution may be finely dispersed in water by using another water-soluble surfactant, and the resulting wax particles may be directly added to the ink composition. At this time, the non-water-based organic solvent is preferably, for example, ethyl acetate or the like.

Furthermore, it is also useful to disperse the wax and the specific dispersant in water, subsequently remove the organic solvent, and use the resultant as a wax particle dispersion. In this case, it is advantageous that even if the melting points of the wax and the specific dispersant are 100° C. or higher, the components can be melted and mixed in an organic solvent at a low temperature, and high melting point wax particles in an aqueous system can be produced.

Here, the melting points of the wax and the specific dispersant are not particularly restricted, but the melting points are preferably from 50° C. to 200° C., more preferably 60° C. or higher, and particularly preferably from 80° C. to 150° C.

Regarding the solvent, water is most preferred from the viewpoint of being environment-friendly upon the preparation of the ink composition of the invention. Therefore, in the case of using a wax having a melting point of 80° C., it is necessary to disperse the wax after adjusting the water temperature to 80° C. or higher.

The average particle size of the wax particles is preferably 0.01 μm to 10 μm, more preferably 0.05 μm to 5 μm, and even more preferably 0.1 μm to 2 μm. The wax emulsion is preferably added to the ink composition after the average particle size of the wax particles are adjusted to the range described above.

The content of wax in the ink composition is preferably 0.03 mass % to 15.0 mass % relative to the total mass of the ink composition. It is preferable if the content of wax is higher from the viewpoint of enhancing scratch resistance of the image, but if the content of wax increases, there is a risk that ink ejection properties from ejection orifices or ejection stability may be impaired. Therefore, when the content of wax is adjusted to 15.0 mass % or less, the scratch resistance of the image can be effectively increased while the ink ejection properties and ejection stability are maintained satisfactorily. Furthermore, as described above, a wax emulsion is an emulsion containing a dispersant so as to contain a wax that is not easily dispersed in water, in a dispersed state.

On the other hand, when the content of wax is 0.03 mass % or higher, it is implied that the wax emulsion substantially contains a wax.

Within the range of the content described above, the content of wax is more preferably 0.05 mass % to 10.0 mass %, even more preferably 0.07 mass % to 10.0 mass %, particularly preferably 0.10 mass % to 10.0 mass %, and most preferably 0.10 mass % to 7.0 mass %, relative to the total mass of the ink composition.

In the present invention, when a wax emulsion is incorporated as a wax into the ink composition, the content of the wax in the ink composition is referred to as the solid content of the wax emulsion.

(Pyrrolidone Derivative)

The ink composition according to the invention preferably contains at least one pyrrolidone derivative. When a pyrrolidone derivative is further incorporated in the ink composition containing the compound represented by the structural formula (1), abrasion resistance of the image is enhanced, and when multiple sheets are processed at a high speed, abrasion failure such as scratch on the image can be prevented.

Regarding the pyrrolidone derivative according to the invention, any compound having a 5-membered ring containing a lactam structure can be used without limitations. A lactam structure is a structure containing —CO—NR— in a portion of the ring, and R in the structure represents a monovalent group.

Examples of the monovalent group include a hydrogen atom, an alkyl group, an aryl group, and alkenyl group. Among them, the monovalent group is preferably a hydrogen atom or an alkyl group; more preferably a hydrogen atom or an alkyl group having 1 to 4 carbon atoms; and particularly preferably a hydrogen atom.

The alkyl group, aryl group, and alkenyl group may be substituted or may not be substituted, but these groups are preferably unsubstituted.

When R represents an alkyl group, the carbon number of the alkyl group is preferably 1 to 10, more preferably 1 to 6, and particularly preferably 1 to 4. The alkyl group may have a linear structure, a branched structure, or a cyclic structure. Specific examples of the alkyl group include a methyl group, an ethyl group, a propyl group, an isopropyl group, a butyl group, an isobutyl group, a sec-butyl group, a tert-butyl group, a pentyl group, an isopentyl group, a neopentyl group, an octyl group, a nonyl group, a decyl group, a cyclopropyl group, a cyclobutyl group, a cyclopentyl group, a cyclohexyl group, a cycloheptyl group, and a cyclooctyl group.

Examples of the substituent in the case where the alkyl group has a substituent include an alkoxy group having 1 to 8 carbon atoms, an aryl group having 6 to 14 carbon atoms, a hydroxyl group, a carboxyl group, and a halogen atom (a fluorine atom, a chlorine atom, an iodine atom, or the like).

When R represents an aryl group, the carbon number of the aryl group is preferably 6 to 20, more preferably 6 to 14, and particularly preferably 6 to 10. Specific examples of the aryl group include a phenyl group, a naphthyl group, and an anthryl group.

Examples of the substituent when the aryl group has a substituent include an alkoxy group having 1 to 8 carbon atoms, an alkyl group having 1 to 10 carbon atoms, a hydroxyl group, a carboxyl group, and a halogen atom (a fluorine atom, a chlorine atom, an iodine atom, or the like).

When R represents an alkenyl group, the carbon number of the alkenyl group is preferably 2 to 10, more preferably 2 to 6, and particularly preferably 2 to 4. The alkenyl group may have a linear structure, a branched structure, or a cyclic structure. Specific examples of the alkenyl group include an ethenyl group, a 1-propenyl group, a 2-propenyl group, a 2-methyl-1-propenyl group, a 1-butenyl group, a 2-butenyl group, a 3-butenyl group, a 3-methyl-2-butenyl group, a 1-pentenyl group, a 2-pentenyl group, a 3-pentenyl group, a 4-pentenyl group, a 4-methyl-3-pentenyl group, a 1-hexenyl group, a 3-hexenyl group, a 5-hexenyl group, a 1-heptenyl group, and a 1-octenyl group.

Examples of the substituent when the alkenyl group has a substituent include an alkoxy group having 1 to 8 carbon atoms, an aryl group having 6 to 14 carbon atoms, a hydroxyl group, a carboxyl group, and a halogen atom (a fluorine atom, a chlorine atom, an iodine atom or the like).

The pyrrolidone derivative is preferably a compound represented by the following general formula (P-1)

[Chem. 9]

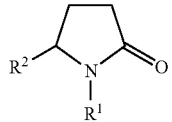

(P-1)

In the general formula (P-1), $R^1$ represents a hydrogen atom, an alkyl group, an aryl group or an alkenyl group. The alkyl group, aryl group and alkenyl group represented by $R^1$ have the same meanings as the alkyl group, aryl group and alkenyl group represented by R in the "structure containing —CO—NR—", and preferred examples also have the same meanings.

$R^2$ represents a hydrogen atom or an alkyl group. The alkyl group represented by $R^2$ preferably has 1 to 10 carbon atoms, and may have any of a linear structure, a branched structure and a cyclic structure. Specific examples of the alkyl group include the same examples of the alkyl group represented by R in the "structure containing —CO—NR—".

$R^2$ is preferably a hydrogen atom or an alkyl group having 1 to 4 carbon atoms, and particularly preferably a hydrogen atom.

Among the compounds represented by the general formula (P-1), particularly an embodiment in which $R^1$ represents a hydrogen atom or an alkyl group having 1 to 4 carbon atoms, and $R^2$ represents a hydrogen atom or an alkyl group having 1 to 4 carbon atoms is preferred, and an embodiment in which $R^1$ and $R^2$ are together hydrogen atoms is particularly preferred.

Examples of the pyrrolidone derivative according to the invention include 2-pyrrolidone, N-methyl-2-pyrrolidone, N-ethyl-2-pyrrolidone, N-butyl-2-pyrrolidone, N-vinyl-2-pyrrolidone, 5-methyl-2-pyrrolidone, N-phenyl-2-pyrrolidone, N-cyclohexyl-2-pyrrolidone, and N-hydroxyethyl-2-pyrrolidone. Among these, from the viewpoint of increasing the scratch resistance of an image, 2-pyrrolidone, N-methyl-2-pyrrolidone and N-ethyl-2-pyrrolidone are preferred; 2-pyrrolidone and N-methyl-2-pyrrolidone are more preferred, and 2-pyrrolidone is particularly preferred.

The content of the pyrrolidone derivative in the ink composition according to the invention is preferably 3.0 mass % to 20.0 mass %, more preferably 4.0 mass % to 16.0 mass %, particularly preferably 6.0 mass % to 15.0 mass %, and most preferably 6.0 mass % to 12.0 mass %, relative to the total mass of the ink composition. When the content of the pyrrolidone derivative is 3.0 mass % or more, scratch resistance of the image can be further increased. Furthermore, when the content of the pyrrolidone derivative is 20.0 mass % or less, it is advantageous to maintain the ink composition stably.

According to the invention, the content ratio (p/s; mass ratio) of the pyrrolidone derivative (p) to the compound (s) represented by the structural formula (1) is preferably from 0.075 to 4.0. When the content ratio p/s is 0.075 or higher, scratch resistance of the image can be further enhanced. Furthermore, when the content ratio p/s is 4.0 or less, the effect of preventing the strike through phenomenon occurring when the ink composition applied on a recording medium penetrates to the back surface of the recording medium is high, and it is advantageous in suppressing curling. For the same reasons, the content ratio p/s is more preferably in the range of from 0.09 to 3.5, and particularly preferably in the range of from 0.11 to 3.2.

(Water)

The ink composition according to the invention contains water, but the content of water is not particularly limited. Above all, the content of water is preferably from 10 mass % to 99 mass %, more preferably from 20 mass % to 80 mass %, even more preferably 30 mass % to 70 mass %, and particularly preferably 40 mass % to 60 mass %, relative to the total mass of the ink composition from the viewpoints of securing stability and ejection reliability.

Water is preferably water from which ionic impurities have been removed as much as possible, such as pure water or ultrapure water such as ion-exchanged water, ultrafiltration water, reverse osmosis water, or distilled water. Furthermore, when water that has been sterilized by ultraviolet irradiation or addition of hydrogen peroxide is used, when the pigment dispersion liquid and the ink composition using the dispersion liquid are stored for a long time period, it is suitable in view of preventing the occurrence of fungi or bacteria.

(Other Components)

The ink composition according to the invention may further contain, in addition to the components described above, additives such as a penetrating solvent, a moisture retaining agent, an antiseptic, an antifungal agent, a pH adjusting agent, a chelating agent, and a surfactant, as other components as necessary. Regarding the details of these additives, reference can be made to the descriptions of paragraphs [0067] to [0076] of JP2010-90266.

(Surfactant)

The ink composition according to the invention may contain at least one surfactant. The surfactant can be used as a surface tension adjusting agent. As the surface tension adjusting agent, a compound having a structure which contains a hydrophilic part and a hydrophobic part in the molecule, or the like can be effectively used, and an anionic surfactant, a cationic surfactant, an amphoteric surfactant, a nonionic surfactant, and a betaine-based surfactant can all be used. In the present invention, a nonionic surfactant is preferred from the viewpoint of suppressing ejection interference of the ink composition, and among others, an acetylene glycol-based surfactant is more preferred.

Examples of the acetylene glycol-based surfactant include 2,4,7,9-tetramethyl-5-decyne-4,7-diol and an alkylene oxide adduct of 2,4,7,9-tetramethyl-5-decyne-4,7-diol, and the surfactant is preferably at least one selected from these. Examples of commercially available products of these compounds include the E series of ORFIN E1010 and the like manufactured by Nissin Chemical Industry Co., Ltd.

When the ink composition contains a surfactant (surface tension adjusting agent), from the viewpoint of satisfactorily carrying out ejection of the ink composition by an inkjet system, the surfactant is preferably incorporated in an amount such that the surface tension of the ink composition can be adjusted to 20 mN/m to 60 mN/m. From the viewpoint of the surface tension, the content is more preferably 20 mN/m to 45 mN/m, and even more preferably 25 mN/m to 40 mN/m. The specific amount of the surfactant in a yellow color ink composition is not particularly limited and it is preferable to have the surface tension adjusted to the range described above, and the specific amount is preferably 0.1 mass % or more, more preferably 0.1 mass % to 10 mass %, and even more preferably 0.2 mass % to 3 mass %.

(Recording Medium)

The recording medium used in the image forming method of the invention is not particularly limited, and any of ordinary paper or a paper intended for inkjet printing may be used. Among the papers intended for inkjet printing, a business form paper used in the field of business forms, or a crimped paper such as a crimped postcard is suitable from the viewpoint that the effect is exhibited when an image is formed at a high speed.

—Drying Step—

The image forming method of the invention may be provided with a drying step of heating and drying the ink composition applied in the ink applying step. Through the drying step, the liquid medium (specifically, water, a pyrrolidone derivative, or another water-soluble organic solvent) contained in the ink composition applied on the recording medium evaporates and scatters, and a colored resin coating film is formed. Thereby, high quality images with fewer image defects such as scratches or peeling off can be formed at a high speed on a recording medium.

The drying step can be carried out by a known heating means such as a heater, an air blowing means utilizing air blow such as a dryer, or a means combining these. Examples of the heating method include a method of applying heat to the surface of the recording medium where ink has been applied, and an opposite surface, by a heater or the like (specifically, for example, a method of blowing warm air against the ink-applied surface, and heating the surface opposite to the ink-applied surface with a heater drum); a method of blowing warm air or hot air against the ink-applied surface of the recording medium; and a heating method using an infrared heater. Regarding the heating method, heating may also be carried out by combining plural methods thereof.

The temperature at the time of heating and drying is not particularly limited, and any temperature range capable of drying may be selected. For example, an embodiment of heating by air blowing such that the temperature of the recording medium is 40° C. to 80° C., or an embodiment drying by bringing the recording medium into contact with a drying drum at 50° C. to 110° C. such that the temperature of the recording medium is 40° C. to 80° C., may be used. Furthermore, drying may be performed by using these in combination.

—Cooling Step—

The image forming method of the invention may be provided with a cooling step of cooling the recording medium, after first heating and drying the recording medium in the drying step.

The cooling method may be any method as long as a cooling step capable of actively lowering the temperature of the recording medium can be carried out. Examples of the cooling method include a method of passing the recording medium through a cooling zone, a method of blowing cold air against the recording medium, and a method of bringing the recording medium into contact with a cold object.

—Heating and Fixing Step—

The image forming method of the invention may be further provided, if necessary, with a heating and fixing step of heating the ink composition on the recording medium after the ink applying step and fixing the ink composition thereto. In the heating and fixing step, an image formed by applying the ink composition is heated and thus fixed to the recording medium. Through the heating and fixing treatment, the image on the recording medium is subjected to fixing, and abrasion resistance of the image can be further enhanced.

Heating of the ink composition on the recording medium is preferably carried out, for example, at a temperature equal to or higher than the minimum film-forming temperature (MFT) of the resin particles in the image. When the ink composition is heated to a temperature higher than or equal to the MFT, the resin particles form a film coating, and the image is reinforced. The heating temperature is preferably in a temperature range of (MFT+10° C.) or higher. Specifically, the heating temperature is preferably in the range of 40° C. to 150° C., more preferably in the range of 50° C. to 100° C., and even more preferably 60° C. to 90° C. Pressing may also be carried out together with heating. When heating is carried out under pressure, the pressure at the time of pressing is preferably in the range of 0.1 MPa to 3.0 MPa, from the viewpoint of surface smoothening.

The heating method is not particularly limited, but suitable examples include methods of drying the recording medium in a non-contact manner, such as a method of heating with a heat generator such as a nichrome wire heater; a method of supplying warm air or hot air; and a method of heating with a halogen lamp, an infrared lamp, or the like. Furthermore, the method of heating and pressing is not particularly limited; however, suitable examples thereof include methods of carrying out heating and fixing the recording medium in a contact manner, such as a method of pressing a hot plate on the image-formed surface of the recording medium, and a method of using a heating pressing apparatus equipped with a pair of heating pressing rollers, a pair of heating pressing belts, or a heating pressing belt disposed on the image-recorded surface of the recording medium and a retaining roller disposed on the opposite side, and passing the recording medium between the rollers forming a pair, or the like.

The heating and fixing step of the present invention can be carried out by making reference to the descriptions of JP2010-202773A.

EXAMPLES

Hereinafter, the present invention will be described more specifically based on Examples, but the invention is not intended to be limited to the following Examples as long as the gist is maintained. Unless particularly stated otherwise, the unit "parts" is on a mass basis.

—Synthesis of Water-Soluble Resin (Dispersant) P—

187.5 parts of isopropanol was heated to 80° C. in a nitrogen atmosphere, and a mixed liquid prepared by mixing 478 parts of methyl methacrylate, 172 parts of methacrylic acid, 350 parts of 2-ethylhexyl methacrylate, and 22.05 parts of 2,2'-azobis(2-methylbutyronitrile) was added dropwise thereto over 2 hours. After completion of the dropwise addition, the solution thus obtained was maintained at 80° C. for 4 hours, and then was cooled to 25° C. The solvent was removed under reduced pressure, and thereby, an aqueous solution of a water-soluble resin (dispersant) P having a weight average molecular weight of about 30,000 and an acid value of 154 mg KOH/g was obtained.

Meanwhile, other water-soluble resins according to the invention can also be synthesized by the same method as described above.

—Preparation of Dispersion N of Uncrosslinked Resin-Coated Pigment—

150 parts of the water-soluble resin P obtained as described above was dissolved in water, and an aqueous solution of the water-soluble resin was prepared such that the pH after neutralization using an aqueous solution of potassium hydroxide would be 10.1, and the water-soluble resin concentration would be 30.6 mass %.

147 parts of the aqueous solution of the water-soluble resin thus obtained was mixed with 90 parts of Pigment Blue 15:3 (manufactured by Dainichiseika Color & Chemicals Manufacturing Co., Ltd.; Phthalocyanine Blue A220) and 362 parts of water were mixed, and the mixture was dispersed for 3 hours by using a bead mill (zirconia beads having a diameter of 0.1 mmϕ). Thus, a dispersion N of an uncrosslinked resin-coated pigment having a pigment concentration of 15 mass % was obtained.

—Preparation of Dispersion 1 of Crosslinked Resin-Coated Pigment—

Next, 0.35 parts of polyethylene glycol diglycidyl ether was added to 70 parts of the dispersion N of an uncrosslinked resin-coated pigment obtained as described above, and the mixture was allowed to react for 6.5 hours at 50° C. and then cooled to 25° C. As such, a dispersion 1 of a crosslinked resin-coated pigment having a pigment concentration of 14.9 mass % was obtained.

Example 1

Preparation of Sample 101

The following components including the "dispersion 1 of a crosslinked resin-coated pigment" obtained as described above were mixed and then filtered through a 5-μm membrane filter. Thus, a sample 101 (ink composition) was prepared.

<Components>

| | |
|---|---|
| (1) Dispersion 1 of a crosslinked resin-coated pigment | 27.0 parts |
| (2) Alkylene oxide adduct of glycerin [compound represented by the structural formula (1) (AO: propyleneoxy, l + m + n ≈ 9)] | 10.0 parts |
| (3) NONION E-220S [compound represented by the structural formula (2) (R: oleyl group, p = 0, q = 20), manufactured by NOF Corp.] | 0.03 parts |
| (4) ORFIN E1010 (manufactured by Nissin Chemical Industry Co., Ltd.) | 0.4 parts |
| (5) Ion-exchanged water | Balance (amount to make up 100 parts of the total amount) |

Preparation of Samples 102 to 116

Samples 102 to 116 (ink compositions) were prepared in the same manner as in the case of sample 101, except that the composition used in the preparation of the sample 101 was changed as shown in the following Table 1.

—Image Formation—

The respective samples (ink composition) prepared as described above were charged in sequence into cartridges of a Dimatix Material Printer DMP-2831 manufactured by Fujifilm Dimatix, Inc., and images were formed at a conveyance speed of 100 m/min in a sub-scanning direction. The images thus formed were subjected to the following evaluations.

As the cartridges, cartridges (DMC-11610) for 10 pl (picoliters) ejection were used. And, the printer was modified so as to be able to supply ink compositions from external sources to the relevant cartridges, and so as to be able to draw images at a conveyance speed of 100 m/min. Thus, image formation was carried out. For the image formation, IJ-PDW70 manufactured by Mitsubishi Paper Mills, Ltd. and Npi Form NEXT-IJ70 manufactured by Nippon Paper Industries Co., Ltd. were used as business form papers for inkjet printing. Furthermore, P MAIL manufactured by Kishu Paper Co., Ltd. was used as a crimped postcard, and Npi Form 55 manufactured by Nippon Paper Industries Co., Ltd. was used as normal paper.

—Evaluation 1—

(1) Scratch Resistance

The respective samples were ejected in an amount such that the amount of ink applied would be 6 g/m², and images formed from ordinary characters of "優, 並, and 劣" (Japanese Kanji) and outlined characters of "優, 並, and 劣" were drawn on respective papers (recording media) of the business form papers IJ-PDW70 and Npi Form NEXT-1J70, which are intended for inkjet printing. One hour after the image drawing, the recording media after the time passage were folded such that the image-drawn surfaces would come inside. The two facing image-drawn surfaces were rubbed each other twenty times under pressing the folded recording media at a pressure of 0.15 kg/cm². This operation was carried out 10 times for each of the recording media after the time passage, and a sensory evaluation was carried out by five evaluators according to the following evaluation criteria. The average point of the scores of the five evaluators was determined for each of the recording media, and was used as an evaluation index. The evaluation results are indicated in the following Table 1.

<Evaluation Criteria>

5: Blurring or bleeding of images did not occur in any of the ordinary characters and outlined characters, and a satisfactory image quality was obtained.

4: Slight blurring or bleeding of images occurred in both the ordinary characters and outlined characters, but the image quality was of an acceptable level.

3: Blurring or bleeding of images occasionally occurred in both the ordinary characters and outlined characters, but the characters could be discriminated, and the image quality was of a practically acceptable level.

2: Blurring or bleeding of images occurred in both the ordinary characters and outlined characters, and the image quality was a quality causing practical impediment, such that discrimination of outlined characters was made impossible particularly due to the influence of bleeding.

1: Blurring or bleeding of images occurred in both the ordinary characters and outlined characters, and the image quality was a quality causing practical impediment, such that discrimination of both the ordinary characters and the outlined characters was impossible due to the influence of bleeding.

(2) Curling Characteristics

A data image that is actually used in the field of slips was assumed, and a image including solid images and character images was drawn on respective papers of Npi Form NEXT-IJ70, which is a business form paper intended for inkjet printing, and Npi Form 55 (manufactured by Nippon Paper Industries Co., Ltd.), which is an ordinary paper. After the image drawing, each of the papers was cut to a size of 254×127 mm and was left to stand for 24 hours under the conditions of a temperature of 25° C. and a humidity of 55% RH. Thereafter, a sensory evaluation of the curling behavior was carried out by five evaluators according to the following evaluation criteria. The average point of the scores of the five evaluators was determined for each of the papers, and was used as an evaluation index. The evaluation results are indicated in the following Table 1.

<Evaluation Criteria>

5: The image was at a level that curling could be hardly recognized, and was in a state that could be used without problems.

4: The image was at a level that slight curling could be recognized, but was in a state that could be used without hindrance.

3: The image was at a level that curling could be recognized, but was in a state that was practically acceptable.

2: The image was at a level that curling could be recognized, and had a quality that caused impediment in practical use.

1: The image was at a level that curling could be clearly recognized, and had a quality that caused impediment in practical use.

(3) Suitability to Crimped Postcard

On a crimped postcard, P MAIL, a solid image was formed such that the density would be 1.0. After the image formation, the crimped postcard was crimped within 24 hours. At this time, crimping was carried out such that the press pressure was adjusted to obtain a peeling force upon detaching after crimping of 500 gf. After forty-eight hours passed after crimping, the crimped postcard was detached, and the presence or absence of an image reflected on the surface that faced the surface on which the solid image was formed, was visually observed. The evaluation was carried out by five evaluators according to the following evaluation criteria, and the average point of the scores of the five evaluators was determined and used as an evaluation index. The evaluation results are indicated in the following Table 1.

<Evaluation Criteria>

5: The boundary between the solid image area and the white background area on the opposite surface was completely unrecognizable, and the crimped postcard was in a state that could be used without any problems.

4: The boundary between the solid image area and the white background area on the opposite surface was almost unrecognizable, and then the crimped postcard was in a state that could be used without impediment.

3: The boundary between the solid image and the white background area on the opposite surface was recognizable, but the crimped postcard was in a state of being practically acceptable.

2: Pigments from various sites of the solid image area were reflected on the opposite surface, and the crimped postcard had a quality that caused impediment when used as a crimped postcard.

1: Pigments from most of the solid image area were reflected on the opposite surface, and the crimped postcard had a quality that was not suitable to be used as a crimped postcard and caused impediment in practical use.

TABLE 1

| | | Composition | | | | | | Evaluation results | | |
|---|---|---|---|---|---|---|---|---|---|---|
| | | Alkylene oxide adduct of glycerin (compound of structural formula (1)) | | R—O—[PO)$_p$—(EO)$_q$]—OH (compound of structural formula (2)) | | | | | | |
| Sample | Pigment | Kind | Amount added [mass %] | R (carbon number) | p | q | Amount added [mass %] | Scratch resistance | Curling characteristics | Suitability to crimped postcard |
| Sample 101 (Invention) | Crosslinked pigment | AO = propyleneoxy l + m − n≈9 | 10 | Oleyl group (18) | 0 | 20 | 0.03 | 4.6 | 4.4 | 4.4 |
| Sample 102 (Invention) | Crosslinked pigment | AO = propyleneoxy l + m n≈9 | 14 | Oleyl group (18) | 0 | 20 | 0.5 | 4.6 | 4.6 | 4.8 |
| Sample 103 (Invention) | Crosslinked pigment | AO = propyleneoxy l + m − n≈9 | 35 | Oleyl group (18) | 0 | 20 | 8 | 4.0 | 4.8 | 4.6 |
| Sample 104 (Invention) | Crosslinked pigment | AO = propyleneoxy l + m − n≈9 | 30 | Oleyl group (18) | 0 | 50 | 3 | 4.4 | 4.8 | 4.6 |
| Sample 105 (Invention) | Crosslinked pigment | AO = propyleneoxy l + m − n≈9 | 15 | Oleyl group (18) | 0 | 20 | 0.1 | 4.2 | 4.2 | 4.4 |
| Sample 106 (Invention) | Crosslinked pigment | AO = propyleneoxy l + m − n≈9 | 20 | Decyl group (10) | 0 | 15 | 2 | 4.6 | 4.6 | 4.8 |
| Sample 107 (Invention) | Crosslinked pigment | AO- propyleneoxy l + m − n≈3 | 18 | Lauryl group (12) | 0 | 7 | 3 | 4.4 | 4.4 | 4.2 |
| Sample 108 (Invention) | Crosslinked pigment | AO = propyleneoxy l + m − n≈5 | 18 | Lauryl group (12) | 0 | 30 | 5 | 4.2 | 4.8 | 4.2 |
| Sample 109 (Invention) | Crosslinked pigment | AO- propyleneoxy l + m − n≈9 | 3 | Behenyl group (22) | 0 | 30 | 0.03 | 3.4 | 3.0 | 3.6 |
| Sample 110 (Invention) | Crosslinked pigment | AO = propyleneoxy l + m + n≈14 | 8 | Cetyl group (16) | 8 | 20 | 0.05 | 4.2 | 4.2 | 4.0 |
| Sample 111 (Invention) | Crosslinked pigment | AO = propyleneoxy l + m − n≈9 | 6 | Lauryl group (12) | 5 | 6 | 7 | 4.0 | 3.2 | 4.0 |
| Sample 112 (Invention) | Crosslinked pigment | AO = propyleneoxy l + m − n≈9 | 5 | Cetyl group (16) | 4 | 5 | 13 | 4.2 | 3.0 | 4.4 |
| Sample 113 (Invention) | Crosslinked pigment | AO = ethyleneoxy l + m − n≈9 | 45 | Decyl group (10) | 0 | 30 | 0.01 | 3.2 | 4.4 | 3.4 |
| Sample 114 (Invention) | Crosslinked pigment | AO = ethyleneoxy l + m − n≈7 | 16 | Decyl group (10) | 0 | 15 | 1 | 4.4 | 4.0 | 4.6 |
| Sample 115 (Comparative example) | Crosslinked pigment | AO- propyleneoxy l + m − n≈9 | 25 | Not added | | | | 1.0 | 3.2 | 1.0 |
| Sample 116 (Comparative example) | Crosslinked pigment | Non-crosslinked | | Stearyl group | 5 | 6 | 8 | 3.0 | 1.0 | 2.6 |

As shown in the Table 1, the ink compositions of the invention that used a compound having a propyleneoxy block and an ethyleneoxy block and a glycerin-based compound having a specific structure, had excellent scratch resistance of the image, and an effect of preventing the occurrence of curling was exhibited. Furthermore, when images were formed on crimped postcards, ink impression of the images was suppressed.

On the contrary, in the comparative ink compositions that did not use any of a compound having a propyleneoxy block and an ethyleneoxy block and a glycerin-based compound having a specific structure, satisfactory scratch resistance of the image could not be obtained, and an effect of preventing ink impression when an image was formed on the crimped postcard was not observed. Also, significant occurrence of curling was also recognized.

Example 2

Method for Preparing Wax Dispersion Liquid 140 g of a microcrystalline wax (HI-MIC1090 (melting point 88° C.), manufactured by Nippon Seiro Co., Ltd.) and 60 g of the above-described dispersant WA-2 (dispersant represented by the general formula (WA)) were introduced into a 1-liter stainless steel dispersing machine, and the mixture was mixed while heated to 100° C. to be uniform. Thereby, a molten mixture having consistency was obtained. To this molten mixture, 700 g of hot water at 95° C. was added, and the mixture was dispersed for 10 minutes at 10,000 rpm by using a homogenizer (manufactured by Nippon Seiki Co., Ltd.). While stirring was continued, the internal temperature was slowly decreased by cooling the dispersing machine, and thus a wax dispersion liquid 1 (solid concentration 20.0%) which was a solid-state dispersion in which particulate wax was emulsified and dispersed was obtained. The average particle size of the wax dispersion liquid 1 was 0.2 μm.

Preparation of Sample 202

The following components including "wax dispersion liquid 1" obtained as described above were mixed and then filtered through a 5-μm membrane filter. Thus, a sample 202 (ink composition) was prepared.
(Components)

| | |
|---|---|
| 1) Dispersion 1 of crosslinked resin-coated pigment | 29.0 parts |
| 2) Alkylene oxide adduct of glycerin [compound represented by the structural formula (1) (AO: ethyleneoxy, l + m + n ≈ 7) | 8.0 parts |
| Polyoxyethylene (20) cetyl ether [compound represented by the structural formula (2) (R: cetyl group, p = 0, q = 20), manufactured by Wako Pure Chemical Industries, Ltd.] | 1.0 part |
| 4) ORFIN E1010 [manufactured by Nissin Chemical Co., Ltd.] | 1.0 part |
| 5) Wax dispersion liquid 1 | 15.0 parts |
| 6) Ion-exchanged water | Balance (amount to make up 100 parts of the total amount) |

Preparation of Samples 201, 203 to 214

Samples 201 and 203 to 214 (ink compositions) were prepared in the same manner as in the case of the sample 202, except that the components (1) to (3) and (5) in the composition described above for the preparation of the sample 202 were changed as indicated in the following Table 2.

Furthermore, SELOSOL 524 manufactured by Chukyo Yushi Co., Ltd. was used as carnauba wax, and SELOSOL R526 manufactured by Chukyo Yushi Co., Ltd. Was used as paraffin wax.

—Evaluation 2—

(4) Ejection Reliability

The samples 201 to 214 (ink compositions) prepared as described above were respectively charged in sequence into cartridges of a Dimatix Material Printer DMP-2831 manufactured by Fujifilm Dimatix, Inc., and 96 lines were drawn for a length of 10 cm with an ink droplet amount of 5.5 pl on Kassai Photo Finish Pro (manufactured by Fujifilm Corp.). In this manner, 14 kinds of evaluation sample A (samples $A^{201}$ to sample $A^{214}$) were produced. For each of the evaluation samples, the respective intervals (distances) between the 96 lines drawn in an area of 5 cm in width from the initiation point of ejection were measured by using a dot analyzer DA-6000 [manufactured by Oji Scientific Instruments Co., Ltd.], and the standard deviations were calculated.

Next, after the image drawing carried out upon the preparation of the evaluation samples, while the printer head was left to stand in an environment at 25° C. and 50% RH, ejection was brought to rest for 1 minute. After the rest, printing was carried out again under the same conditions, and evaluation samples B (samples $B^{201}$ to sample $B^{214}$) were produced. For these evaluation samples B, the respective intervals (distances) between the 96 lines drawn in an area of 5 cm in width from the initiation point of ejection were measured as described above, and the standard deviations were also calculated by the same method. The measured values obtained after the rest were used as indicators for evaluating ejection reliability.

From the calculated values of standard deviations after the rest obtained as described above, ejection reliability was scored according to the following evaluation criteria.

<Evaluation Criteria>

5: Equal to or more than 3 μm and less than 3.5 μm

4: Equal to or more than 3.5 μm and less than 4 μm

3: Equal to or more than 4 μm and less than 4.5 μm

2: Equal to or more than 4.5 μm and less than 5 μm

1: 5 μm or more

In addition to that, the rest time for 1 minute in an environment at 25° C. and 50% RH was changed to 3 minutes, 5 minutes, 10 minutes, and 15 minutes, and evaluations samples C, D, E and F were further produced. Thus, the evaluation samples were scored in the same manner as described above. The average points of the six evaluation samples obtained in this manner are shown in the following Table 2.

Furthermore, the scratch resistance of the image and the curling characteristics were evaluated in the same manner as in Evaluation 1 of Example 1. The evaluation results are shown in the following Table 2.

TABLE 2

| | | Alkylene oxide adduct of glycerin (compound of structural formula (1)) | | R—O—[PO]$_p$—(EO)$_q$—OH (compound of structural formula (2)) | | | | Wax | | Evaluation results | | |
|---|---|---|---|---|---|---|---|---|---|---|---|---|
| Sample | Pigment | Kind | Amount added [mass %] | R (carbon number) | p | q | Amount added [mass %] | Kind | Amount added | Scratch resistance | Curling characteristics | Ejection properties |
| Sample 201 (Invention) | Crosslinked pigment | AO = Ethyleneoxy l + m + n≈7 | 8 | Cetyl group (16) | 0 | 20 | 1 | None | — | 4.4 | 4.0 | 4.8 |
| Sample 202 (Invention) | Crosslinked pigment | AO = Ethyleneoxy l + m + n≈7 | 8 | Cetyl group (16) | 0 | 20 | 1 | Wax dispersed liquid 1 (microcrystalline wax) | 3 | 4.8 | 4.0 | 4.2 |
| Sample 203 (Invention) | Crosslinked pigment | AO = Ethyleneoxy l + m + n≈7 | 25 | Cetyl group (16) | 0 | 20 | 4 | Paraffin wax | 3 | 4.6 | 4.4 | 4.0 |
| Sample 204 (Invention) | Crosslinked pigment | AO = Propyleneoxy l + m + n≈9 | 16 | Decyl group (10) | 0 | 15 | 2 | Carnauba wax | 0.03 | 4.2 | 4.4 | 5.0 |
| Sample 205 (Invention) | Crosslinked pigment | AO = Propyleneoxy l + m + n≈9 | 16 | Decyl group (10) | 0 | 15 | 2 | Carnauba wax | 0.1 | 4.6 | 4.4 | 4.8 |
| Sample 206 (Invention) | Crosslinked pigment | AO = Propyleneoxy l + m + n≈9 | 16 | Decyl group (10) | 0 | 15 | 2 | Carnauba wax | 0.5 | 4.6 | 4.6 | 5.0 |
| Sample 207 (Invention) | Crosslinked pigment | AO- Propyleneoxy l + m + n≈9 | 16 | Decyl group (10) | 0 | 15 | 2 | Carnauba wax | 1 | 4.8 | 4.6 | 5.0 |
| Sample 208 (Invention) | Crosslinked pigment | AO = Propyleneoxy l + m + n≈9 | 16 | Decyl group (10) | 0 | 15 | 8 | Carnauba wax | 1 | 4.8 | 4.6 | 4.8 |
| Sample 209 (Invention) | Crosslinked pigment | AO = Propyleneoxy l + m + n≈9 | 16 | Decyl group (10) | 0 | 15 | 13 | Carnauba wax | 1 | 5.0 | 4.6 | 4.6 |
| Sample 211 (Invention) | Crosslinked pigment | AO = Propyleneoxy l + m + n≈9 | 40 | Decyl group (10) | 0 | 15 | 2 | Carnauba wax | 1 | 4.4 | 4.8 | 5.0 |
| Sample 212 (Invention) | Crosslinked pigment | AO = Propyleneoxy l + m + n≈9 | 7 | Decyl group (10) | 0 | 15 | 2 | Carnauba wax | 1 | 4.8 | 4.0 | 5.0 |
| Sample 213 (Invention) | Crosslinked pigment | AO = Propyleneoxy l + m + n≈9 | 34 | Decyl group (10) | 0 | 15 | 5 | Carnauba wax | 7 | 5.0 | 4.6 | 3.6 |
| Sample 214 (Invention) | Crosslinked pigment | AO = Propyleneoxy l + m + n≈9 | 34 | Decyl group (10) | 0 | 15 | 7 | Carnauba wax | 10 | 5.0 | 4.6 | 3.0 |
| Sample 215 (Invention) | Crosslinked pigment | AO = Ethyleneoxy l + m + n≈9 | 24 | Cetyl group (16) | 0 | 20 | 3 | Carnauba wax | 15 | 5.0 | 4.2 | 2.8 |

As can be seen from the Table 2, while the recording medium was conveyed at a conveyance speed of 100 m/min and images were formed, samples 202 to 214 all had excellent abrasion resistance of the images and curling characteristics, as compared to sample 201. Furthermore, the sample 202 to sample 212 where the amount of wax added was smaller exhibited excellent ejection properties as compared with sample 213 and sample 214. Particularly, the sample 202 to sample 212 having an amount of wax added of 0.03 mass % to 7 mass % exhibited satisfactory ejection properties. As such, according to the image forming method of the invention, it was found that when a wax is added, even in the case of forming images at a high speed on a recording medium such as a business form paper, images having superior abrasion resistance can be formed.

Example 3

Samples 301 to 306 were prepared in the same manner as in Example 1, except that the pyrrolidone derivatives indicated in the following Table 3 were added to the composition of sample 101 used in Example 1, in the amount of addition indicated in the table.

TABLE 3

| Sample | Pyrrolidone derivative | Amount added [mass %] |
|---|---|---|
| Sample 301 (Invention) | 2-Pyrrolidone | 9 |
| Sample 302 (Invention) | N-methyl-2-pyrrolidone | 9 |
| Sample 303 (Invention) | N-ethyl-2-pyrrolidone | 7 |
| Sample 304 (Invention) | N-butyl-2-pyrrolidone | 6 |
| Sample 305 (Invention) | N-vinyl-2-pyrrolidone | 5 |

TABLE 3-continued

| Sample | Pyrrolidone derivative | Amount added [mass %] |
|---|---|---|
| Sample 306 (Invention) | 5-Methyl-2-pyrrolidone | 4 |

The respective samples indicated in the Table 3 were evaluated for the scratch resistance of the image, curling characteristics, and suitability to crimped postcard in the same manner as in Example 1, and in samples 301 to 306, the same scratch resistance of the image, curling characteristics and suitability to crimped postcard as those obtained for the sample 101 of Example 1 were recognized. Furthermore, sample 301 was slightly superior to samples 302 to 306, among samples 301 to 306.

Example 4

A sample 401 was produced in the same manner as in Example 1, except that the crosslinked pigment (dispersion 1 of a crosslinked resin-coated pigment) in the composition of the sample 101 used in Example 1 was replaced with the dispersion N of an uncrosslinked resin-coated pigment.

The sample 401 thus obtained was evaluated for the scratch resistance of the image, curling characteristics, and suitability to postcard in the same manner as in Example 1. As a result, satisfactory scratch resistance of the image, curling characteristics and suitability to postcard were also recognized in the sample 401, although the characteristics were slightly inferior to those of the sample 101.

—Evaluation 3—
(5) Dispersion Stability

The respective ink compositions of samples 101 to 113, samples 201 to 214, samples 301 to 306, and samples 401, which are ink compositions according to the invention, were stored for 14 days in a constant temperature chamber at 60° C., and the particle size and viscosity after completion of storage were measured. The dispersity stability was evaluated such that smaller widths of the particle size change and viscosity change before and after the storage mean satisfactory dispersity stability.

Meanwhile, the particle size was measured by using a NanoTrack particle size distribution analyzer, UPA-EX150 (manufactured by Nikkiso Co., Ltd.), and the viscosity was measured by using VISCOMETER TV-22 (manufactured by Toki Sangyo Co., Ltd.), under the conditions of 25° C.

As a result of the measurements, when samples 101 to 113, samples 201 to 214, samples 301 to 306, and sample 401 were compared, the dispersity stability when the samples were formulated into ink compositions was superior in the samples 101 to 113, samples 201 to 214, and samples 301 to 306.

Example 5

The following components further including Latex PL-01 as described below in the composition of the sample 101 used in Example 1 were mixed and then filtered through a 5-μm membrane filter. Thus, a sample 501 was prepared.

<Components>

| | |
|---|---|
| (1) Dispersion 1 of crosslinked pigment-containing resin particles | 27.0 parts |
| (2) Alkylene oxide adduct of glycerin [compound represented by the structural formula (1) (AO: propyleneoxy, l + m + n ≈ 9)] | 10.0 parts |
| (3) NONION E-220S [compound represented by the structural formula (2) (R: oleyl group, p = 0, q = 20), manufactured by NOF Corp.] | 0.03 parts |
| (4) Latex PL-01 described below | 20.0 parts |
| (5) ORFIN E1010 (manufactured by Nissin Chemical Co., Ltd.) | 0.4 parts |
| (6) Ion-exchanged water | Balance (amount to make up 100 parts of the total amount) |

—Preparation of Latex—

19.8 g of LATEMUL ASK (manufactured by Kao Corp., carboxylate-based emulsifier), 6 g of 5 mol/L aqueous solution of sodium hydroxide, and 0.3 g of 2,2'-azobis(2-amidinopropane)dihydrochloride were added to 120 g of water, and the mixture was uniformly dissolved to obtain a solution. The solution was heated to 70° C. A monomer mixture of 25.9 g of styrene, 26.3 g of butyl acrylate, and 5.1 g of acrylic acid was added thereto over 2 hours under a nitrogen gas stream. Thereafter, the mixture was heated for 2 hours at 70° C., and for 3 hours at 80° C. The reaction solution thus obtained was cooled to room temperature, and then while being stirred, 1 mol/L aqueous solution of sodium hydroxide was added to the reaction solution so that the pH would be adjusted to approximately 9. Thus, latex PL-01 was prepared.

The volume average particle size of the resin particles in the latex thus obtained was 115 nm, and the glass transition temperature (Tg) was 80° C. or higher. Furthermore, the solid content of the latex PL-01 was 33 mass %.

The sample 501 thus obtained was evaluated for scratch resistance of the image, curling characteristics, and suitability to crimped postcard in the same manner as in Example 1. As a result, the sample 501 was also recognized to exhibit the same scratch resistance of the image, curling characteristics, and suitability to crimped postcard as those of the sample 101 of Example 1.

Meanwhile, similarly to the sample 501, when the ink composition was applied on a recording medium, the image thus obtained was subjected to a fixing treatment by passing the image between a pair of fixing rollers that had been heated to 80° C. or higher, a further improvement of the scratch resistance of the image was recognized.

This application claims priority under 35 U.S.C. §119 of Japanese Patent application JP 2012-075113, filed on Mar. 28, 2012, Japanese Patent application JP 2012-171402, filed on Aug. 1, 2012, and Japanese Patent application JP 2013-028933, filed on Feb. 18, 2013, the entire contents of which are hereby incorporated by reference.

What is claimed is:

1. An image forming method comprising applying an ink composition containing a pigment, a compound represented by the following structural formula (1), a compound represented by the following structural formula (2), water and a pyrrolidone derivative, onto a recording medium being conveyed at a conveyance speed of 80 m/min or higher:

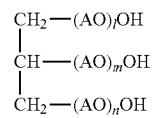

Structural formula (1)

wherein in the structural formula (1), l, m and n each independently represent an integer of 1 or more, the relation: l+m+n=3 to 15 is satisfied; and AO represents at least one of ethyleneoxy and propyleneoxy;

$$R—O—[(PO)_p\text{-}(EO)_q]\text{-}OH \quad \text{Structural formula (2)}$$

wherein in the structural formula (2), R represents a hydrocarbon group having 6 to 30 carbon atoms, and may be any of a saturated group or an unsaturated group; PO represents propyleneoxy; EO represents ethyleneoxy; and p and q each independently represent an integer, and the relations: $0 \leq p \leq 10$ and $1 \leq q \leq 50$ are satisfied.

2. The image forming method according to claim 1, wherein the ink composition further comprises a wax.

3. The image forming method according to claim 1, wherein AO in the structural formula (1) is propyleneoxy.

4. The image forming method according to claim 1, wherein R in the structural formula (2) represents an alkyl group having 8 to 24 carbon atoms or an alkenyl group having 8 to 24 carbon atoms; p is in the range of $0 \leq p \leq 8$, and q is in the range of $5 \leq q \leq 50$.

5. The image forming method according to claim 1, wherein the ink composition further comprises a wax, and the wax is in the form of wax particles.

6. The image forming method according to claim 1, wherein the pyrrolidone derivative is at least one of 2-pyrrolidone and N-methyl-2-pyrrolidone.

7. The image forming method according to claim 1 wherein the ink composition further comprises waxes, and at least one of the waxes is carnauba wax.

8. The image forming method according to claim 1, wherein the pigment is a resin-coated pigment obtained by coating at least a portion of the pigment surface with a crosslinked polymer that has been produced by crosslinking a water-soluble resin with a crosslinking agent.

9. The image forming method according to claim 2, wherein the pigment is a resin-coated pigment obtained by coating at least a portion of the pigment surface with a crosslinked polymer that has been produced by crosslinking a water-soluble resin with a crosslinking agent.

10. The image forming method according to claim 8, wherein the water-soluble resin contains a carboxyl group or a salt thereof in the molecule, and the crosslinking agent is a bifunctional or higher-functional epoxy compound.

11. The image forming method according to claim 1, wherein the content of the compound represented by the structural formula (1) is 3.0 mass % to 45.0 mass % relative to the total mass of the ink composition.

12. The image forming method according to claim 1, wherein the content of the compound represented by the structural formula (2) is 0.01 mass % to 13.0 mass %, relative to the total mass of the ink composition.

13. The image forming method according to claim 1, wherein the ink composition further comprises a wax, and the content of the wax is 0.03 mass % to 15.0 mass % relative to the total mass of the ink composition.

14. The image forming method according to claim 1, wherein the content of the pyrrolidone derivative is 3.0 mass % to 20.0 mass % relative to the total mass of the ink composition.

15. The image forming method according to claim 1, wherein the ink composition further comprises resin particles having a glass transition temperature of 80° C. or higher.

16. The image forming method according to claim 8, wherein the ink composition further comprises resin particles having a glass transition temperature of 80° C. or higher.

17. The image forming method according to claim 15, further comprising heating the ink composition applied by applying processing to fix the ink composition on the recording medium.

18. The image forming method according to claim 16, further comprising heating the ink composition applied by applying processing to fix the ink composition on the recording medium.

* * * * *